US008386680B2

(12) United States Patent
Schubert et al.

(10) Patent No.: US 8,386,680 B2
(45) **Date of Patent: *Feb. 26, 2013**

(54) COMMUNICATION BETWEEN AN ACCESSORY AND A MEDIA PLAYER WITH MULTIPLE PROTOCOL VERSIONS AND EXTENDED INTERFACE LINGO

(75) Inventors: Emily Clark Schubert, San Jose, CA (US); Wang Chun Leung, Mountain View, CA (US); Gregory T. Lydon, Santa Cruz, CA (US); Scott Krueger, San Francisco, CA (US); Paul Phillip Holden, San Francisco, CA (US); John Archibald, San Francisco, CA (US); Lawrence G. Bolton, Fremont, CA (US); Donald J. Novotney, San Jose, CA (US); John Benjamin Filson, Mountain View, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/296,554

(22) Filed: Nov. 15, 2011

(65) Prior Publication Data

US 2012/0102236 A1 Apr. 26, 2012

Related U.S. Application Data

(63) Continuation of application No. 12/424,432, filed on Apr. 15, 2009, now Pat. No. 8,082,376, which is a continuation of application No. 11/479,314, filed on Jun. 30, 2006, now Pat. No. 7,526,588, and a continuation-in-part of application No. 10/833,689, filed on Apr. 27, 2004, now Pat. No. 7,441,062.

(60) Provisional application No. 60/784,306, filed on Mar. 20, 2006.

(51) Int. Cl.
*G06F 13/42* (2006.01)

(52) U.S. Cl. ............... 710/105; 710/62; 710/64; 710/16

(58) Field of Classification Search .......... 710/104–110, 710/313–315, 8–19, 62–64, 72–74
See application file for complete search history.

(56) References Cited

U.S. PATENT DOCUMENTS

| | | | |
|---|---|---|---|
| 4,673,861 | A | 6/1987 | Dubovsky et al. |
| 4,850,899 | A | 7/1989 | Maynard |
| 4,916,334 | A | 4/1990 | Minagawa et al. |
| 4,924,216 | A | 5/1990 | Leung |
| 4,938,483 | A | 7/1990 | Yavetz |
| 5,041,025 | A | 8/1991 | Haitmanek |
| 5,051,606 | A | 9/1991 | Ikehara |
| 5,055,069 | A | 10/1991 | Townsend et al. |

(Continued)

FOREIGN PATENT DOCUMENTS

| | | | |
|---|---|---|---|
| EP | 1104150 | A2 | 5/2001 |
| EP | 1150472 | A2 | 10/2001 |

(Continued)

OTHER PUBLICATIONS

Altec Lansing, "inMOTION Users Guide," Corp. Headquarters, 535 Rte.6 & 209, Milford, PA 18337. (8 pages).

(Continued)

*Primary Examiner* — Raymond Phan
(74) *Attorney, Agent, or Firm* — Kilpatrick Townsend & Stockton LLP

(57) ABSTRACT

An interface and protocol allow a media player to communicate with external accessories over a transport link. The protocol includes a core protocol functionality and a number of accessory lingoes. Examples of accessory lingoes include a microphone lingo, a simple remote lingo, a display remote lingo, an RF transmitter lingo, and an extended interface lingo.

34 Claims, 14 Drawing Sheets

U.S. PATENT DOCUMENTS

| | | | |
|---|---|---|---|
| 5,080,603 | A | 1/1992 | Mouissie |
| 5,104,243 | A | 4/1992 | Harding |
| 5,108,313 | A | 4/1992 | Adams |
| 5,150,031 | A | 9/1992 | James et al. |
| 5,186,646 | A | 2/1993 | Pederson |
| 5,247,138 | A | 9/1993 | Landmeier |
| 5,277,624 | A | 1/1994 | Champion |
| 5,471,128 | A | 11/1995 | Patino et al. |
| 5,525,981 | A | 6/1996 | Abernethy |
| 5,586,893 | A | 12/1996 | Mosquera |
| 5,592,588 | A | 1/1997 | Reekes et al. |
| 5,618,045 | A | 4/1997 | Kagan et al. |
| 5,648,712 | A | 7/1997 | Hahn |
| 5,660,558 | A | 8/1997 | Osanai et al. |
| 5,675,467 | A | 10/1997 | Nishimura et al. |
| 5,727,866 | A | 3/1998 | Kraines et al. |
| 5,732,361 | A | 3/1998 | Liu |
| 5,754,027 | A | 5/1998 | Oglesbee et al. |
| 5,830,001 | A | 11/1998 | Kinoshita |
| 5,835,862 | A | 11/1998 | Nykanen et al. |
| 5,845,217 | A | 12/1998 | Lindell et al. |
| 5,859,522 | A | 1/1999 | Theobald |
| 5,884,323 | A | 3/1999 | Hawkins et al. |
| 5,901,049 | A | 5/1999 | Schmidt et al. |
| 5,964,847 | A | 10/1999 | Booth, III et al. |
| 5,975,957 | A | 11/1999 | Noda et al. |
| 5,991,640 | A | 11/1999 | Lilja et al. |
| 6,007,372 | A | 12/1999 | Wood |
| 6,012,105 | A | 1/2000 | Rubbmark et al. |
| 6,031,797 | A | 2/2000 | Van Ryzin et al. |
| 6,053,773 | A | 4/2000 | Wu |
| 6,078,402 | A | 6/2000 | Fischer et al. |
| 6,078,789 | A | 6/2000 | Bodenmann et al. |
| 6,125,455 | A | 9/2000 | Yeo |
| 6,130,518 | A | 10/2000 | Gabehart et al. |
| 6,139,373 | A | 10/2000 | Ward et al. |
| 6,154,773 | A | 11/2000 | Roberts et al. |
| 6,154,798 | A | 11/2000 | Lin et al. |
| 6,161,027 | A | 12/2000 | Poirel |
| 6,169,387 | B1 | 1/2001 | Kaib |
| 6,175,358 | B1 | 1/2001 | Scott-Jackson et al. |
| 6,178,514 | B1 | 1/2001 | Wood |
| 6,184,652 | B1 | 2/2001 | Yang |
| 6,184,655 | B1 | 2/2001 | Malackowski |
| 6,188,265 | B1 | 2/2001 | Liu et al. |
| 6,192,340 | B1 | 2/2001 | Abecassis |
| 6,203,345 | B1 | 3/2001 | Roque et al. |
| 6,204,637 | B1 | 3/2001 | Rengan |
| 6,206,480 | B1 | 3/2001 | Thompson |
| 6,211,581 | B1 | 4/2001 | Farrant |
| 6,211,649 | B1 | 4/2001 | Matsuda |
| 6,224,420 | B1 | 5/2001 | Nishio et al. |
| 6,230,205 | B1 | 5/2001 | Garrity et al. |
| 6,230,322 | B1 | 5/2001 | Saib et al. |
| 6,234,827 | B1 | 5/2001 | Nishio et al. |
| 6,236,395 | B1 | 5/2001 | Sezan et al. |
| 6,247,135 | B1 | 6/2001 | Feague |
| 6,252,380 | B1 | 6/2001 | Koenck |
| 6,255,961 | B1 | 7/2001 | Van Ryzin et al. |
| 6,261,109 | B1 | 7/2001 | Liu et al. |
| 6,262,723 | B1 | 7/2001 | Matsuzawa et al. |
| 6,267,623 | B1 | 7/2001 | Hisamatsu |
| 6,268,845 | B1 | 7/2001 | Pariza et al. |
| 6,271,605 | B1 | 8/2001 | Carkner et al. |
| 6,272,328 | B1 | 8/2001 | Nguyen et al. |
| 6,280,251 | B1 | 8/2001 | Nishio et al. |
| 6,283,789 | B1 | 9/2001 | Tsai |
| 6,304,764 | B1 | 10/2001 | Pan |
| 6,314,326 | B1 | 11/2001 | Fuchu |
| 6,314,479 | B1 | 11/2001 | Frederick et al. |
| 6,316,916 | B2 | 11/2001 | Bohne |
| 6,319,061 | B1 | 11/2001 | Chen et al. |
| 6,322,396 | B1 | 11/2001 | Kuan |
| 6,336,365 | B1 | 1/2002 | Blackadar et al. |
| 6,344,727 | B1 | 2/2002 | Desai et al. |
| 6,353,894 | B1 | 3/2002 | Pione |
| 6,354,713 | B1 | 3/2002 | Leifer et al. |
| 6,358,089 | B1 | 3/2002 | Kuroda et al. |
| 6,372,974 | B1 | 4/2002 | Gross et al. |
| 6,377,825 | B1 | 4/2002 | Kennedy et al. |
| 6,385,596 | B1 | 5/2002 | Wiser et al. |
| 6,394,905 | B1 | 5/2002 | Takeda et al. |
| 6,418,421 | B1 | 7/2002 | Hurtado et al. |
| 6,429,622 | B1 | 8/2002 | Svensson |
| 6,429,879 | B1 | 8/2002 | Sturgeon et al. |
| 6,431,915 | B1 | 8/2002 | Ko |
| 6,453,371 | B1 | 9/2002 | Hampson et al. |
| 6,454,592 | B2 | 9/2002 | Takagi |
| 6,461,173 | B1 | 10/2002 | Mizuno et al. |
| 6,464,542 | B1 | 10/2002 | Lee |
| 6,468,110 | B2 | 10/2002 | Fujino et al. |
| 6,476,825 | B1 | 11/2002 | Croy et al. |
| 6,478,603 | B1 | 11/2002 | Wu |
| 6,483,428 | B1 | 11/2002 | Fish et al. |
| 6,485,328 | B1 | 11/2002 | Wu |
| 6,489,751 | B2 | 12/2002 | Small et al. |
| 6,501,441 | B1 | 12/2002 | Ludtke et al. |
| 6,505,160 | B1 | 1/2003 | Levy et al. |
| 6,524,119 | B2 | 2/2003 | Kato et al. |
| 6,526,287 | B1 | 2/2003 | Lee |
| 6,535,983 | B1 | 3/2003 | McCormack et al. |
| 6,558,201 | B1 | 5/2003 | Begley et al. |
| 6,559,773 | B1 | 5/2003 | Berry |
| 6,577,877 | B1 | 6/2003 | Charlier et al. |
| 6,589,076 | B1 | 7/2003 | Davis et al. |
| 6,591,085 | B1 | 7/2003 | Grady |
| 6,608,264 | B1 | 8/2003 | Fouladpour |
| 6,608,399 | B2 | 8/2003 | McConnell et al. |
| 6,614,232 | B1 | 9/2003 | Mukai |
| 6,616,473 | B2 | 9/2003 | Kamata et al. |
| 6,629,197 | B1 | 9/2003 | Bhogal et al. |
| 6,642,629 | B2 | 11/2003 | DeLeeuw |
| 6,643,777 | B1 | 11/2003 | Chu |
| 6,651,138 | B2 | 11/2003 | Lai et al. |
| 6,653,813 | B2 | 11/2003 | Khatri |
| 6,663,420 | B1 | 12/2003 | Xiao |
| 6,665,803 | B2 | 12/2003 | Lunsford et al. |
| 6,670,997 | B1 | 12/2003 | Nortrup |
| 6,674,995 | B1 | 1/2004 | Meyers et al. |
| 6,687,454 | B1 | 2/2004 | Kuroiwa |
| 6,697,944 | B1 | 2/2004 | Jones et al. |
| 6,708,283 | B1 | 3/2004 | Nelvin et al. |
| 6,724,339 | B2 | 4/2004 | Conway et al. |
| 6,725,061 | B1 | 4/2004 | Hutchison, IV et al. |
| 6,728,546 | B1 | 4/2004 | Peterson et al. |
| 6,728,729 | B1 | 4/2004 | Jawa et al. |
| 6,747,859 | B2 | 6/2004 | Walbeck et al. |
| 6,754,468 | B1 | 6/2004 | Sieben et al. |
| 6,761,635 | B2 | 7/2004 | Hoshino et al. |
| 6,774,939 | B1 | 8/2004 | Peng |
| 6,776,626 | B2 | 8/2004 | Huang et al. |
| 6,776,660 | B1 | 8/2004 | Kubota et al. |
| 6,776,665 | B2 | 8/2004 | Huang |
| 6,799,226 | B1 | 9/2004 | Robbin et al. |
| 6,801,964 | B1 | 10/2004 | Mahdavi |
| 6,813,528 | B1 | 11/2004 | Yang |
| 6,816,376 | B2 | 11/2004 | Bright et al. |
| 6,830,160 | B2 | 12/2004 | Risolia |
| 6,859,538 | B1 | 2/2005 | Voltz |
| 6,859,854 | B2 | 2/2005 | Kwong |
| 6,879,843 | B1 | 4/2005 | Kim |
| 6,928,295 | B2 | 8/2005 | Olson et al. |
| 6,931,266 | B2 | 8/2005 | Miyoshi et al. |
| 6,931,456 | B2 | 8/2005 | Payne et al. |
| 6,939,177 | B2 | 9/2005 | Kato et al. |
| 6,944,704 | B2 | 9/2005 | Brelin |
| 6,991,483 | B1 | 1/2006 | Milan et al. |
| 7,004,787 | B2 | 2/2006 | Milan |
| 7,006,793 | B2 | 2/2006 | Himmel et al. |
| 7,013,164 | B2 | 3/2006 | Lin |
| 7,040,919 | B2 | 5/2006 | Yao |
| 7,046,230 | B2 | 5/2006 | Zadesky |
| 7,050,783 | B2 | 5/2006 | Curtiss et al. |
| 7,054,888 | B2 | 5/2006 | LaChapelle et al. |
| 7,062,261 | B2 | 6/2006 | Goldstein et al. |
| 7,108,560 | B1 | 9/2006 | Chou et al. |
| 7,120,462 | B2 | 10/2006 | Kumar |

7,127,678 B2 10/2006 Bhesania et al.
7,127,879 B2 10/2006 Zhu et al.
7,149,543 B2 12/2006 Kumar
7,155,545 B1 12/2006 Wang
7,167,112 B2 1/2007 Andersen et al.
7,167,935 B2 1/2007 Hellberg
7,187,947 B1 3/2007 White et al.
7,187,948 B2 3/2007 Alden
7,215,042 B2 5/2007 Yan
7,281,214 B2 10/2007 Fadell
7,283,635 B1 10/2007 Anderson et al.
7,293,122 B1 11/2007 Schubert et al.
7,293,227 B2 11/2007 Plastina et al.
7,299,304 B2 11/2007 Saint-Hilaire et al.
7,303,282 B2 12/2007 Dwyer et al.
7,304,685 B2 12/2007 Park et al.
7,305,254 B2 12/2007 Findikli
7,305,506 B1 12/2007 Lydon et al.
7,324,833 B2 1/2008 White et al.
7,362,963 B2 4/2008 Lin
7,363,129 B1 4/2008 Barnicle et al.
7,391,963 B2 6/2008 Chen et al.
7,415,563 B1 8/2008 Holden et al.
7,441,058 B1 10/2008 Bolton et al.
7,441,062 B2 10/2008 Novotney et al.
7,444,388 B1 10/2008 Svendsen
7,450,961 B1 11/2008 Heubel et al.
7,454,019 B2 11/2008 Williams
7,493,645 B1 2/2009 Tranchina
7,526,588 B1 4/2009 Schubert et al.
7,529,870 B1 5/2009 Schubert et al.
7,529,871 B1 5/2009 Schubert et al.
7,529,872 B1 5/2009 Schubert et al.
7,558,894 B1 7/2009 Lydon et al.
7,587,540 B2 9/2009 Novotney et al.
7,590,783 B2 9/2009 Lydon et al.
7,610,350 B2 10/2009 Abdulrahiman et al.
7,634,605 B2 12/2009 Laefer et al.
7,647,129 B1 1/2010 Griffin
7,660,929 B2 2/2010 Novotney et al.
7,670,263 B2 3/2010 Ellis et al.
7,673,020 B2 3/2010 Rosenbloom et al.
7,673,083 B2 3/2010 Laefer et al.
7,680,849 B2 3/2010 Heller et al.
7,681,033 B2 3/2010 Miura et al.
7,702,833 B2 4/2010 Novotney et al.
7,757,026 B2 7/2010 Novotney et al.
7,779,185 B2 8/2010 Schubert et al.
7,791,319 B2 9/2010 Veselic et al.
7,797,471 B2 9/2010 Laefer et al.
7,823,214 B2 10/2010 Rubinstein et al.
7,853,746 B2 12/2010 Novotney et al.
7,877,532 B2 1/2011 Schubert et al.
8,082,376 B2 * 12/2011 Schubert et al. .............. 710/105
2001/0003205 A1 6/2001 Gilbert
2001/0005641 A1 6/2001 Matsumoto et al.
2001/0006884 A1 7/2001 Matsumoto
2001/0042107 A1 11/2001 Palm
2002/0002035 A1 1/2002 Sim et al.
2002/0010759 A1 1/2002 Hitson et al.
2002/0015362 A1 2/2002 Cowgill et al.
2002/0025042 A1 2/2002 Saito
2002/0029303 A1 3/2002 Nguyen
2002/0065074 A1 5/2002 Cohn et al.
2002/0068610 A1 6/2002 Anvekar et al.
2002/0072390 A1 6/2002 Uchiyama
2002/0103008 A1 8/2002 Rahn et al.
2002/0105861 A1 8/2002 Leapman
2002/0108108 A1 8/2002 Akaiwa et al.
2002/0115480 A1 8/2002 Huang
2002/0116533 A1 8/2002 Holliman et al.
2002/0120850 A1 8/2002 Walker et al.
2002/0132651 A1 9/2002 Jinnouchi
2002/0151327 A1 10/2002 Levitt
2002/0152874 A1 10/2002 Vilcauskas et al.
2002/0156546 A1 10/2002 Ramaswamy
2002/0156949 A1 10/2002 Kubo et al.
2002/0161865 A1 10/2002 Nguyen
2002/0173273 A1 11/2002 Spurgat et al.
2002/0174269 A1 11/2002 Spurgat et al.
2002/0194621 A1 12/2002 Tran et al.
2003/0004934 A1 1/2003 Qian
2003/0011608 A1 1/2003 Wada
2003/0028664 A1 2/2003 Tan et al.
2003/0041206 A1 2/2003 Dickie
2003/0059022 A1 3/2003 Nebiker et al.
2003/0067741 A1 4/2003 Alfonso et al.
2003/0073432 A1 4/2003 Meade
2003/0079038 A1 4/2003 Robbin et al.
2003/0090988 A1 5/2003 Sun et al.
2003/0097379 A1 5/2003 Ireton
2003/0110403 A1 6/2003 Crutchfield et al.
2003/0151621 A1 8/2003 McEvilly et al.
2003/0167318 A1 9/2003 Robbin et al.
2003/0172209 A1 9/2003 Liu et al.
2003/0185395 A1 10/2003 Lee et al.
2003/0198015 A1 10/2003 Vogt
2003/0212895 A1 11/2003 Kisliakov
2003/0215102 A1 11/2003 Marlowe
2003/0220988 A1 11/2003 Hymel
2003/0236075 A1 12/2003 Johnson et al.
2003/0237043 A1 12/2003 Novak et al.
2004/0003300 A1 1/2004 Malueg et al.
2004/0019497 A1 1/2004 Volk et al.
2004/0039860 A1 2/2004 Mills et al.
2004/0048569 A1 3/2004 Kawamura
2004/0055446 A1 3/2004 Robbin et al.
2004/0090998 A1 5/2004 Chen
2004/0103223 A1 5/2004 Gabehart et al.
2004/0116005 A1 6/2004 Choi
2004/0151327 A1 8/2004 Marlow
2004/0162029 A1 8/2004 Grady
2004/0164708 A1 8/2004 Veselic et al.
2004/0172533 A1 9/2004 DeMello et al.
2004/0186935 A1 9/2004 Bell et al.
2004/0194154 A1 9/2004 Meadors et al.
2004/0198436 A1 10/2004 Alden
2004/0224638 A1 11/2004 Fadell et al.
2004/0235339 A1 11/2004 Sato et al.
2004/0249994 A1 12/2004 Shapiro et al.
2004/0252966 A1 12/2004 Holloway et al.
2004/0267812 A1 12/2004 Harris et al.
2004/0267825 A1 12/2004 Novak et al.
2004/0268397 A1 12/2004 Dunbar et al.
2005/0001589 A1 1/2005 Edington
2005/0014119 A1 1/2005 Rudakov
2005/0014531 A1 1/2005 Findikli
2005/0014536 A1 1/2005 Grady
2005/0015355 A1 1/2005 Heller et al.
2005/0017946 A1 1/2005 Park
2005/0018768 A1 1/2005 Mabey et al.
2005/0022212 A1 1/2005 Bowen
2005/0047071 A1 3/2005 Tse Chun Hin
2005/0080915 A1 4/2005 Shoemaker et al.
2005/0111675 A1 5/2005 Lee
2005/0135790 A1 6/2005 Hutten
2005/0138433 A1 6/2005 Linetsky
2005/0149213 A1 7/2005 Guzak et al.
2005/0149551 A1 7/2005 Fong et al.
2005/0181756 A1 8/2005 Lin
2005/0198189 A1 9/2005 Robinson et al.
2005/0207726 A1 9/2005 Chen
2005/0227612 A1 10/2005 Helstrom et al.
2005/0239333 A1 10/2005 Watanabe et al.
2005/0240705 A1 10/2005 Novotney et al.
2005/0246375 A1 11/2005 Manders et al.
2005/0251565 A1 11/2005 Weel
2005/0281185 A1 12/2005 Kawasaki
2006/0015826 A1 1/2006 Shiozawa et al.
2006/0031545 A1 2/2006 Manders et al.
2006/0056796 A1 3/2006 Nishizawa et al.
2006/0088228 A1 4/2006 Marriott et al.
2006/0116009 A1 6/2006 Langberg et al.
2006/0143680 A1 6/2006 Adachi
2006/0150123 A1 7/2006 Goodwin et al.
2006/0156415 A1 7/2006 Rubinstein et al.
2006/0161621 A1 7/2006 Rosenberg
2006/0163358 A1 7/2006 Biderman

| | | | |
|---|---|---|---|
| 2006/0168298 | A1 | 7/2006 | Aoki et al. |
| 2006/0184456 | A1 | 8/2006 | de Janasz |
| 2006/0188237 | A1 | 8/2006 | Watanabe et al. |
| 2006/0205349 | A1 | 9/2006 | Passier et al. |
| 2006/0224620 | A1 | 10/2006 | Silverman et al. |
| 2006/0236245 | A1 | 10/2006 | Agarwal et al. |
| 2006/0247851 | A1 | 11/2006 | Morris |
| 2006/0258289 | A1 | 11/2006 | Dua |
| 2006/0277555 | A1 | 12/2006 | Howard |
| 2006/0294209 | A1 | 12/2006 | Rosenbloom et al. |
| 2007/0011138 | A1 | 1/2007 | Boucard |
| 2007/0018947 | A1 | 1/2007 | Toro-Lira |
| 2007/0056012 | A1 | 3/2007 | Kwon et al. |
| 2007/0056013 | A1 | 3/2007 | Duncan |
| 2007/0070856 | A1 | 3/2007 | Tebele |
| 2007/0077784 | A1 | 4/2007 | Kalayjian et al. |
| 2007/0080823 | A1 | 4/2007 | Fu et al. |
| 2007/0083750 | A1 | 4/2007 | Miura et al. |
| 2007/0083814 | A1 | 4/2007 | Wilbrink et al. |
| 2007/0086724 | A1 | 4/2007 | Grady et al. |
| 2007/0106760 | A1 | 5/2007 | Houh et al. |
| 2007/0130592 | A1 | 6/2007 | Haeusel |
| 2007/0173197 | A1 | 7/2007 | Hsiung |
| 2007/0173294 | A1 | 7/2007 | Hsiung |
| 2007/0206827 | A1 | 9/2007 | Tupman et al. |
| 2007/0209081 | A1 | 9/2007 | Morris |
| 2007/0226238 | A1 | 9/2007 | Kiilerich et al. |
| 2007/0226384 | A1 | 9/2007 | Robbin et al. |
| 2007/0230910 | A1 | 10/2007 | Welch et al. |
| 2007/0233294 | A1 | 10/2007 | Holden et al. |
| 2007/0233295 | A1 | 10/2007 | Laefer et al. |
| 2007/0234420 | A1 | 10/2007 | Novotney et al. |
| 2007/0236482 | A1 | 10/2007 | Proctor et al. |
| 2007/0244984 | A1 | 10/2007 | Svendsen |
| 2007/0247794 | A1 | 10/2007 | Jaffe et al. |
| 2007/0271387 | A1 | 11/2007 | Lydon et al. |
| 2007/0280489 | A1 | 12/2007 | Roman et al. |
| 2007/0291404 | A1 | 12/2007 | Morse et al. |
| 2007/0300155 | A1 | 12/2007 | Laefer et al. |
| 2008/0010014 | A1 | 1/2008 | Hess |
| 2008/0025172 | A1 | 1/2008 | Holden et al. |
| 2008/0034325 | A1 | 2/2008 | Ording |
| 2008/0055272 | A1 | 3/2008 | Anzures et al. |
| 2008/0065722 | A1 | 3/2008 | Brodersen et al. |
| 2008/0155129 | A1 | 6/2008 | Khedouri et al. |
| 2008/0188209 | A1 | 8/2008 | Dorogusker et al. |
| 2009/0013110 | A1 | 1/2009 | Novotney et al. |
| 2009/0013253 | A1 | 1/2009 | Laefer et al. |
| 2009/0125134 | A1 | 5/2009 | Bolton et al. |
| 2009/0132076 | A1 | 5/2009 | Holden et al. |
| 2009/0198361 | A1 | 8/2009 | Schubert et al. |
| 2009/0204244 | A1 | 8/2009 | Schubert et al. |
| 2009/0204738 | A1 | 8/2009 | Schubert et al. |
| 2009/0210079 | A1 | 8/2009 | Schubert et al. |
| 2009/0249101 | A1 | 10/2009 | Lydon et al. |
| 2009/0292835 | A1 | 11/2009 | Novotney et al. |
| 2009/0299506 | A1 | 12/2009 | Lydon et al. |
| 2010/0049350 | A1 | 2/2010 | Laefer et al. |
| 2010/0106879 | A1 | 4/2010 | Laefer et al. |
| 2010/0312931 | A1 | 12/2010 | Schubert et al. |
| 2010/0312932 | A1 | 12/2010 | Schubert et al. |
| 2011/0066775 | A1 | 3/2011 | Schubert et al. |
| 2011/0066776 | A1 | 3/2011 | Schubert et al. |

FOREIGN PATENT DOCUMENTS

| | | | |
|---|---|---|---|
| EP | 1367734 | A1 | 12/2003 |
| EP | 1498899 | A1 | 1/2005 |
| EP | 1594319 | A1 | 11/2005 |
| EP | 1672613 | A2 | 6/2006 |
| GB | 2405718 | A | 3/2005 |
| JP | 07-176351 | A | 7/1995 |
| JP | 10-321302 | A | 4/1998 |
| JP | 10-334993 | A | 12/1998 |
| JP | 11-288420 | A | 10/1999 |
| JP | 2000-214953 | A | 8/2000 |
| JP | 2000-223215 | A | 8/2000 |
| JP | 2000-223216 | A | 8/2000 |
| JP | 2000-223218 | A | 8/2000 |
| JP | 2001-035603 | A | 2/2001 |
| JP | 2001-069165 | A | 3/2001 |
| JP | 2001-196133 | A | 7/2001 |
| JP | 2001-230021 | A | 8/2001 |
| JP | 2001-332350 | A | 11/2001 |
| JP | 2001-339393 | A | 12/2001 |
| JP | 2002-025720 | A | 1/2002 |
| JP | 2002-140304 | A | 5/2002 |
| JP | 2002-203641 | A | 7/2002 |
| JP | 2002-221974 | A | 8/2002 |
| JP | 2002-245719 | A | 8/2002 |
| JP | 2002-252566 | A | 9/2002 |
| JP | 3090747 | U | 10/2002 |
| JP | 2002-342659 | A | 11/2002 |
| JP | 2002-374447 | A | 12/2002 |
| JP | 2003-017165 | A | 1/2003 |
| JP | 2003-032351 | A | 1/2003 |
| JP | 2003-058430 | A | 2/2003 |
| JP | 2003-274386 | A | 9/2003 |
| JP | 2004-078538 | A | 3/2004 |
| JP | 2004-259280 | A | 9/2004 |
| JP | 2008053955 | A | 3/2008 |
| JP | 2008071419 | A | 3/2008 |
| JP | 2009303001 | A | 12/2009 |
| TW | 530267 | | 5/2003 |
| WO | WO 99/26330 | A2 | 5/1999 |
| WO | WO 99/48089 | A2 | 9/1999 |
| WO | WO 00/39907 | A1 | 7/2000 |
| WO | WO 00/60450 | A1 | 10/2000 |
| WO | WO 02/49314 | A2 | 6/2002 |
| WO | WO 03/036541 | A1 | 5/2003 |
| WO | WO 03/036957 | A1 | 5/2003 |
| WO | WO 03/056776 | A1 | 7/2003 |
| WO | WO 03/073688 | A1 | 9/2003 |
| WO | WO 2004/084413 | A2 | 9/2004 |
| WO | WO 2004/095772 | A1 | 11/2004 |
| WO | WO 2004/112311 | A1 | 12/2004 |
| WO | WO 2005/109781 | A1 | 11/2005 |
| WO | WO 2005/119463 | A2 | 12/2005 |
| WO | WO 2006/071364 | A1 | 7/2006 |
| WO | WO 2006/073702 | A1 | 7/2006 |
| WO | WO 2006/080957 | A2 | 8/2006 |
| WO | WO 2007/139660 | A2 | 12/2007 |
| WO | WO 2011/031760 | A1 | 3/2011 |

OTHER PUBLICATIONS

Anonymous, "Future of Digital Music in Windows," Microsoft Windows Hardware Developer Central Archive, Dec. 4, 2001[Online], [retrieved on Jan. 15, 2008]. <URL:http://www.microsoft.com/whdc/archive/digitaudio.mspx> (3 pages).

Anonymous, "Introduction to Digital Audio," Microsoft Windows Hardware Developer Central Archive, Dec. 4, 2001 [Online], [retrieved on Jan. 15, 2008]. <URL:http://www.microsoft.com/whdc/archive/digitaudio.mspx> (2 pages).

Anonymous, "Windows and Red Book Audio," Microsoft Windows Hardware Developer Central Archive, Dec. 4, 2001 [Online], [retrieved Jan. 15, 2008]. <URL:http://www.microsoft.com/whdc/archive/Dmfuture.mspx> (2 pages).

"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.html p. 7. (2 pages).

Belkin iPod Voice Recorder, Product Specification Sheet, printed Jun. 16, 2004. (2 pages).

Bindra, "Standard Turns Monitor into I/O Hub," Electronic Engineering Times, vol. 918, Sep. 6, 1996, p. 14. (1 page).

Brentrup, "Introduction to Public Key Cryptography Demystified," Campus Technology, printed from http://www.campus-technology.com/article.asp?id=7626 on Oct. 6, 2004. (5 pages).

Brown, "Making USB Work," downloaded Oct. 16, 2001, PC Magazine: PC Tech wysiwyg:/155/http://www.zdnet.com/pcmag/pctech/content!18/04/tu1804.001.html (2 pages).

"Cables to Go," download Oct. 16, 2001 http://www.cablestogo.com/product.asp?cat%5Fid=601&sku=27028 (1 page).

Chen et al., "Design and Implemeation of a Hard Disk-Based Entertainment Device for Managing Media Contents on the Go," Consumer Electonics, 1005. (ISCE 2005). Proceedings of the Ninth International Symposium on, pp. 328-333, Jun. 14-16, 2005. (6 pages).
Crawford et al., "Sample rate conversion and bit rate reduction in the studio," IEEE Colloquium on Digital Audio Signal Processing, May 22, 1991, pp. 8/1-8/3. (3 pages).
Derman, "Monitors Make Net Connections," Electronic Engineering Times, vol. 933, 1996, pp. 60 and 69. (2 pages).
"ExpressBus™ F5U010," User Guide Packing Checklist, Belkin Components Product Warranty. (2 pages).
"FireWire", downloaded Oct. 16,2001; si_wyg:/_/4_2/http://developer.apple._com/hardware/Fire_Wire (2 pages).
"Fire Wire Connector," downloaded Oct. 16, 2001, wysiwyg://76/http://developer.apple.com/...es/Macintosh_CPUs-G3/ibook/ibook-27.html (2 pages).
Fried, "FireWire poised to become ubiquitous," downloaded Oct. 16, 2001, CNET News.com, 1394 Trade Association: Press, wysiwyg:/132/http:/_113_94ta.org/Press/200_1_Press/august!8.2_7._b.html (3 pages).
Fried, "New Fire Wire to blaze faster trail," downloaded Oct. 16, 2001, CNET News.com, http://news.cnet.com/news/0-I006-200-6021210.html (5 pages).
"How to Connect Your Computer PC Hardware", downloaded Oct. 16, 2001, http:///www.scar.utoronto.ca!~ccweb/faculty/connect-howto.html (5 pages).
"IEEE 1394/USB Comparison," downloaded Oct. 16, 2001, www.genitech.com.aulLIBRARY/TechSupportiinfobits/firewirevsusb.html (4 pages).
"Introduction to Public Key Cryptography," Oct. 9, 1998, printed from http://developer.netscape.com/docs/manuals/security/pkin/contents.html on Oct. 6, 2004. (21 pages).
iPod Classic User's Guide, acquired from apple.com, 2002. (44 pages).
iPod nano Features Guide, acquired from apple.com, 2008. (72 pages).
iPod touch User's Guide, acquired from apple.com, 2008. (120 pages).
"iPodDock/iPod Cradle," www.bookendzdocks.com/bookendz/dock_cradle.html, downloaded Feb. 27, 2003. (2 pages).
Lambert, "Digital Audio Interfaces," Journal of the Audio Engineering Society, Audio Engineering Society, New York, NY, vol. 38, No. 9, (Sep. 1, 1990), pp. 681-684, 686, 688, 690, 692 and 696, XP000175146 ISSN: 1549-4950 figures 9, 10. (10 pages).
Lewis, "On Technology" Fortune Magazine, Dec. 9, 2002, p. 240. (1 page).
LSI Logic's Broadcast PC Card Brings New Multimedia Capabilities to Personal Computing. (Nov. 16). PR Newswire, 1. Retrieved Jun. 26, 2010, from Business Dateline. (3 pages).
*MAXTech Technology Ltd., CES 2000*/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm>. (2 pages).
*MAXTech Technology Ltd., CES 2000*/Las Vegas, Jan. 6-9, 2000, [online], [retrieved on Aug. 23, 2008]. Retrieved from the Internet <URL: http://web.archive.org/web/20010223230441/www.maxtech.com.hk/g-p06.htm>. (2 pages).
Menezes et al., "Handbook of Applied Cryptography," *Identification and Entity Authentication*, Jan. 1, 1997, pp. 385-424. (41 pages).
Microsoft, "Media Transport Protocol Implementation Details," 2005. (18 pages).
"MPV™ Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document. (70 pages).
Networking Tech Note, "1394 Standards and Specifications." (3 pages).
"Neuros MP3 Digital Audio Computer," www.neurosaudio.com downloaded Apr. 9, 2003. (6 pages).
NOMAD II Player Version 1.0 (CLI) (User's Manual), Creative Technology, Ltd., Jan. 2000. (46 pages).
"PMC FW2 IEEE1394 FireWire Controller", downloaded Oct. 16, 2001, http://www.bvmltd.co.uk/PMCfw2ds.html (10 pages).
Severance, "FireWire Finally Comes Home," Michigan State University, Standards, Nov. 1998, pp. 117-118. (2 pages).
Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212. (3 pages).
Slay et al., "iPod Forensics: Forencically Sound Examination of an Apple iPod," *System Sciences*, 2007. HICSS 2007. 40th Annual Hawaii Internation Conference on, pp. 1-9, Jan. 2007. (9 pages).
Teener, "Understanding Fire Wire: The IEEE 1394 Standards and Specifications," downloaded Oct. 16, 2001, wysiwyg:119/http:1_Iwww.chipcenter.com/networking/ieee_1394/main.html (5 pages).
"The Authoritative Dictionary of IEEE Standards Terms, Seventh Edition," Published by Standards Information Network, IEEE Press, 2000. (3 pages).
"Universal Serial Bus Specification—Rev 2.0," *Chapter 6: Compaq Hewlett-Packard*, Apr. 27, 2000, pp. 85, 99-100.(7 pages).
"Universal Serial Bus Specification—Rev 2.0," XP002474828, *Chapter 9: USB Device Framework*, pp. 239-274. (36 pages).
Vitaliano, "Why FireWire is Hot!Hot!Hot!" downloaded Oct. 16, 2001, "Impact.FireWire.SideBar" http://www.vxm.com/21R.35.html (4 pages).
Whittle, "Public Key Authentication Framework: Tutorial," First Principles Consulting, Jun. 2, 1996, downloaded Oct. 6, 2004, http://www.ozemail.com.au/~firstpr/crypto/pkaftute.htm (7 pages).

* cited by examiner

| Pin | Signal Name | I/O | Function |
|---|---|---|---|
| 1 | DGND | I | Digital Ground |
| 2 | DGND | I | Digital Ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR (3V3) | O | 3.3V output from iPod. Current limited to 100mA. |
| 14 | Reserved | | |
| 15 | DGND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | O | Serial protocol (Data to iPod) |
| 20 | Accessory Detect | I/O | |
| 21 | S Video Y | O | Luminance Component |
| 22 | S Video C | O | Chrominance Component |
| 23 | Video Composite | O | Composite Signal |
| 24 | Remote Sense | I | Detect Remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Signal, never to be grounded inside accessory |
| 30 | DGND | GND | Digital ground iPod |
| 31 | Chassis | | Chassis ground for connector shell |
| 32 | Chassis | | Chassis ground for connector shell |

FIG. 3A

| Pin | Signal Name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3 V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG. 3B

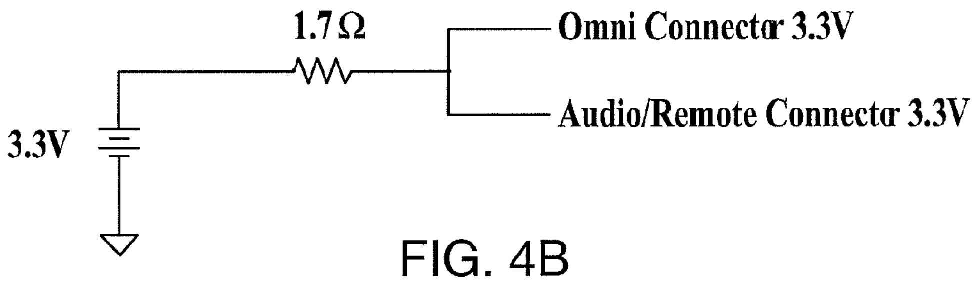

FIG. 4B

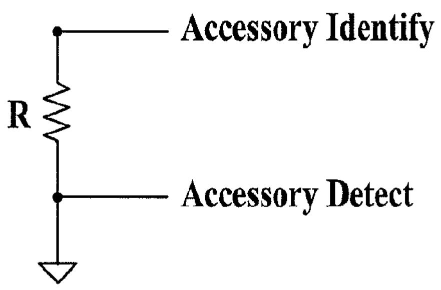

FIG. 4C

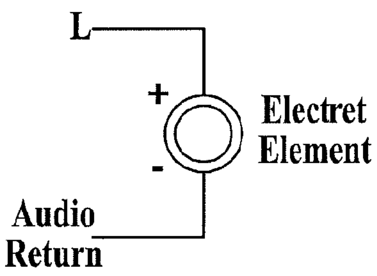

FIG. 4D

COMMUNICATION BETWEEN AN ACCESSORY AND A MEDIA PLAYER WITH MULTIPLE PROTOCOL VERSIONS AND EXTENDED INTERFACE LINGO

CROSS-REFERENCE TO RELATED APPLICATIONS

This application is a continuation of U.S. application Ser. No. 12/424,432, filed Apr. 15, 2009, now U.S. Publication No. 2009/0204244, which is a continuation of U.S. application Ser. No. 11/479,314, filed Jun. 30, 2006, now U.S. Pat. No. 7,526,588, which is a continuation-in-part of U.S. application Ser. No. 10/833,689, filed Apr. 27, 2004, now U.S. Pat. No. 7,441,062, and which also claims the benefit of U.S. Provisional Patent Application No. 60/784,306, filed Mar. 20, 2006, entitled "Connector Interface System." The disclosures of each of these applications are incorporated herein by reference in their entirety.

FIELD OF THE INVENTION

The present invention relates generally to connector interfaces and more particularly to a connector interface system which is utilized in conjunction with media players and their accessories.

BACKGROUND OF THE INVENTION

A media player stores media assets, such as audio tracks or photos, that can be played or displayed on the media player. One example of a media player is the iPod® media player, which is available from Apple Computer, Inc., of Cupertino, Calif. Often, a media player acquires its media assets from a host computer that serves to enable a user to manage media assets. As an example, the host computer can execute a media management application to manage media assets. One example of a media management application is iTunes®, version 6.0, produced by Apple Computer, Inc.

A media player typically includes one or more connectors or ports that can be used to interface to the media player. For example, the connector or port can enable the media player to couple to a host computer, be inserted into a docking system, or receive an accessory device. There are today many different types of accessory devices that can interconnect to the media player. For example, a remote control can be connected to the connector or port to allow the user to remotely control the media player. As another example, an automobile can include a connector and the media player can be inserted onto the connector such that an automobile media system can interact with the media player, thereby allowing the media content on the media player to be played within the automobile.

Currently, the connectors or ports of a media player are open for use so long as a compatible connector or port is utilized. Consequently, numerous third-parties have developed accessory devices for use with other manufacturers' media players.

In a typical connector interface, there is a docking connector that allows for the docking of the media player device to a docking station for another type of communication for the device. A media player also typically includes a remote connector with the ability to output audio. As more multi-media content becomes available (i.e., digital, video graphics, etc.) it is desirable to have a media player which can effectively input and output such data.

Finally, a media player must be able to identify a particular device's functionality to which it is associated. Heretofore, there is no device that includes features that overcome many of the above-stated problems. What is desired is a connector interface system which is utilized in such a device to address all the above-identified issues. The present invention addresses such a need.

SUMMARY OF THE INVENTION

A connector interface system is disclosed. The connector interface system includes an interface and a protocol in communication with the interface which allows a media player to communicate with external devices over a transport link. The protocol includes a core protocol functionality and a plurality of accessory lingoes. The accessory lingoes comprise a microphone lingo, a simple remote lingo, a display remote lingo, a RF transmitter lingo and an extended interface lingo.

BRIEF DESCRIPTION OF THE DRAWINGS

FIG. 3A illustrates the connector pin designations for the docking connector.

FIG. 3B illustrates the connection pin designations for the remote connector.

FIG. 4B illustrates the USB connector interface.

FIG. 4C illustrates a reference schematic diagram for accessory detect and identify system for detecting and identifying accessories for the docking connector.

FIG. 4D is a reference schematic of an electret microphone that is within the remote connector.

DETAILED DESCRIPTION

Definitions

Device

An external electronic component connected to the media player using the 30-pin connector or the audio/remote connector.

HID

Human Interface Device. HID is a standard USB class of functionality and interface. A USB host such as a PC or Macintosh will recognize any attached USB device that supports a HID interface and makes it available to the application layers of the operating system via a set of programming interfaces. A common application of a HID interface is a USB mouse or joystick.

HID Report

A single unit of data that is used to send data to the HID interface of the media player or from the media player to the host. MPAP packets are broken into HID reports before being sent across the transport link and are reassembled on the receiving side.

MPUI

Media player USB Interface. This is a configuration of the media player when attached as a device over USB. This configuration allows the media player to be controlled using MPAP, using a USB Human Interface Device (HID) interface as a transport mechanism.

Lingo

The command category used by a device. There is a general lingo that must be supported by all devices. Other lingoes are designed for use by specific devices.

Link

The logical connection between an external device and the media player via serial port or other physical connection.

The present invention relates generally to media players and more particularly to a connector interface system for such devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Connector Interface System Overview

To describe the features of the connector interface system in accordance with the present invention in more detail, refer now to the following description in conjunction with the accompanying drawings.

Docking Connector

Figure 1A:
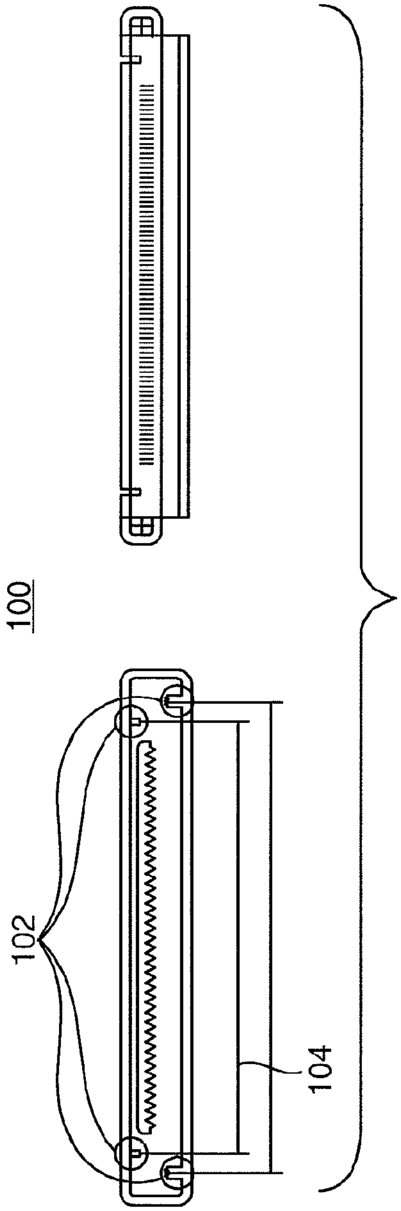
FIGS. 1A and 1B illustrate a docking connector in accordance with the present invention.
Figure 1B:
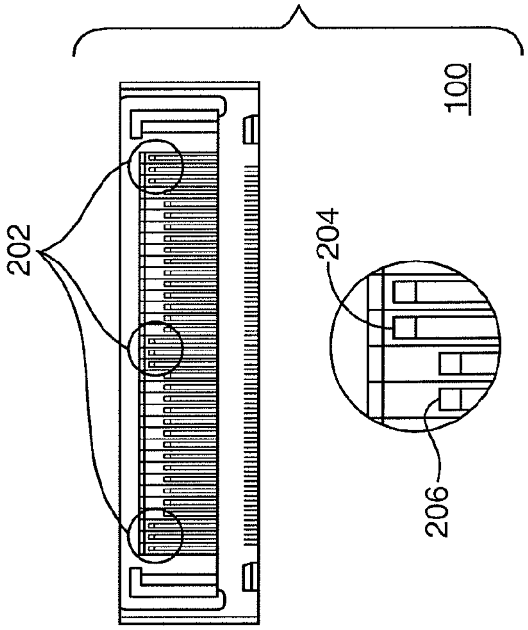

FIGS. 1A and 1B illustrate a docking connector 100 in accordance with the present invention. Referring first to FIG. 1A, the keying features 102 are of a custom length 104. In addition, a specific key arrangement is used where one set keys are separated by one length are at the bottom and another set of keys are separated by another length at the top of the connector. The use of this key arrangement prevents noncompliant connectors from being plugged in and potentially causing damage to the device. The connector for power utilizes a Firewire specification for power. The connector includes a first make/last break contact to implement this scheme. FIG. 1B illustrates the first make/last break contact 202 and also illustrates a ground pin and a power pin related to providing an appropriate first make/last break contact. In this example, the ground pin 204 is longer than the power pin 206. Therefore, the ground pin 204 would contact its mating pin in the docking accessory before the power pin 206. Therefore internal electrical damage of the electronics of the device is minimized.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote systems and devices can interface with the multi-communication device.

Remote Connector

Figure 2A:
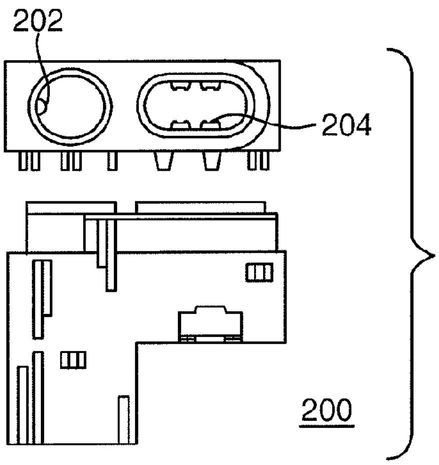
FIGS. 2A-2C illustrate the remote connector in accordance with the present invention.
Figure 2B:
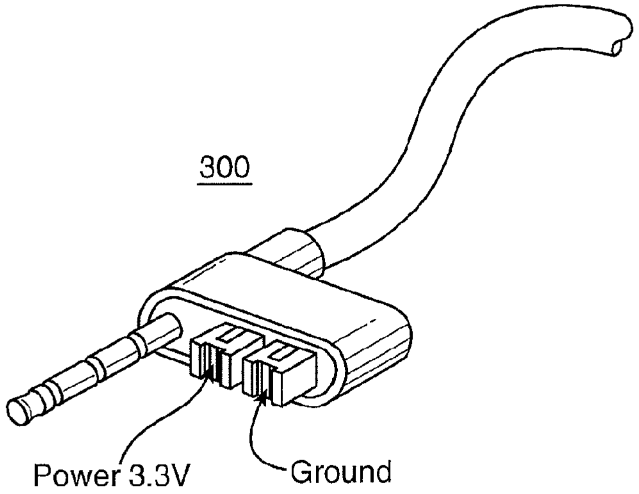
Figure 2C:
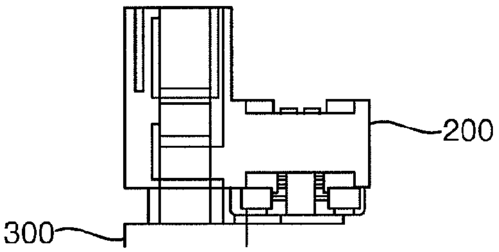

The connection interface system also includes a remote connector which provides for the ability to output audio and, input audio, provides I/O serial protocol, and an output video. FIG. 2A is a front and top view of a remote connector 200 in accordance with the present invention. As is seen, the remote connector 200 includes a top headphone receptacle 202, as well as a second receptacle 204 for remote devices. FIG. 2B illustrates a plug 300 to be utilized in the remote connector. The plug 300 allows the features to be provided via the remote connector. FIG. 2C illustrates the plug 300 inserted into the remote connector 200. Heretofore, all these features have not been implemented in a remote connector. Therefore, a standard headphone cable can be plugged in but also special remote control cables, microphone cables, or video cables could be utilized with the remote connector.

To describe the features of the connector interface system in more detail, please find below a functional description of the docking connector, remote connector and a protocol in accordance with the present invention.

Docking and Remote Connector Specifications

For an example of the connector pin designations for both the docking connector and the remote connector for a multi-communication device such as a media player device by Apple Computer, Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
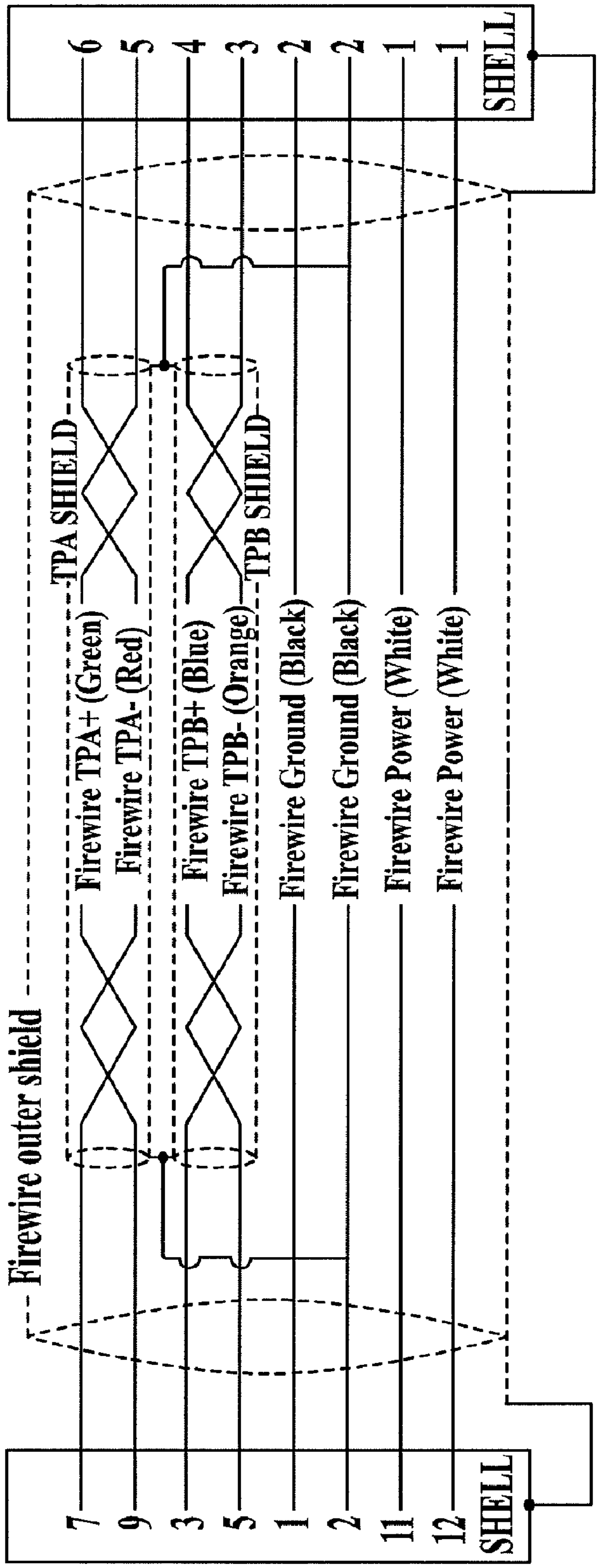
FIG. 4A illustrates the Firewire connector interface.

FIG. 4A illustrates a typical FireWire connector interface for the docking connector.

FireWire Power has the following characteristics: 8V-30V DC IN, 10 W Max. FireWire communication is designed to IEEE 1394 A Spec (400 Mb/s).

USB Interface

The media player provides two configurations, or modes, of USB device operation: mass storage and Media Player USB Interface (MPUI). The MPUI allows the media player to be controlled using a Media Player Accessory Protocol (MPAP) which will be described in detail herein, using a USB Human Interface Device (HID) interface as a transport mechanism.

Accessory 3.3 V Power

FIG. 4B illustrates the USB connector interface. The media player accessory power pin supplies voltages, for example, 3.0 V to 3.3V+/−5% (2.85 V to 3.465 V) over the 30-pin connector. A maximum current is shared between the 30-pin and Audio/Remote connectors.

By default, the media player supplies a particular current such as 5 mA. Proper software accessory detect is required to turn on high power (for example, up to 100 mA) during active device usage. When devices are inactive, they must consume less than 5 mA current.

Accessory power is switched off for a period of, for example, approximately 2 seconds during the media player bootstrap process. This is done to ensure that accessories are in a known state and can be properly detected. All accessories are responsible for re-identifying themselves after the media player completes the bootstrap process and transitions accessory power from the off to the on state.

Accessory power is grounded through the DGND pins.

FIG. 4C illustrates a reference schematic diagram for accessory detect and identify system for detecting and identifying accessories for the docking connector. The system comprises a resistor to ground that allows the device to determine what has been plugged into docking connector. There is an internal pullup on Accessory Identify. Two pins are required (Accessory Identify & Accessory Detect)

FIG. 4D is a reference schematic of an electret microphone that is within the remote connector.

Serial Protocol Communication is provided using two pins to communicate to and from device (Rx & Tx). Input and Output levels are 0V=Low, 3.3V=High.

Media Player Accessory Protocol (MPAP)

Figure 5A:
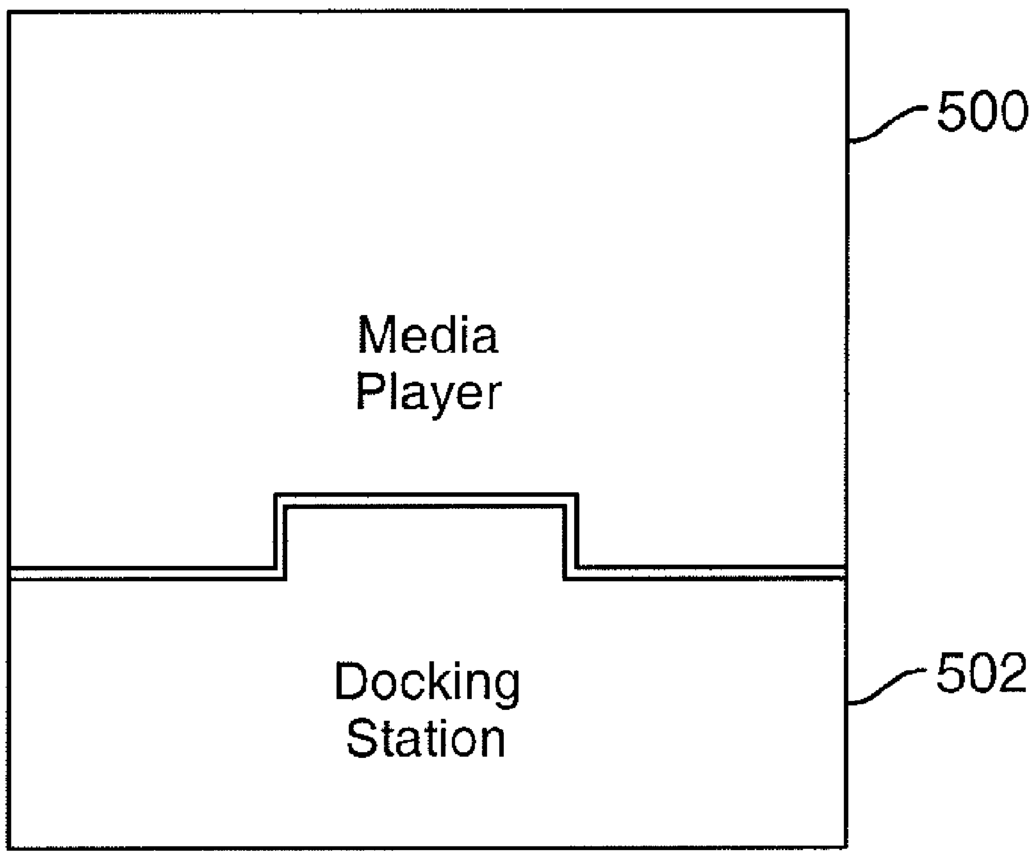
FIGS. 5A-5E illustrate a media player coupled to a plurality of accessories.
Figure 5B:
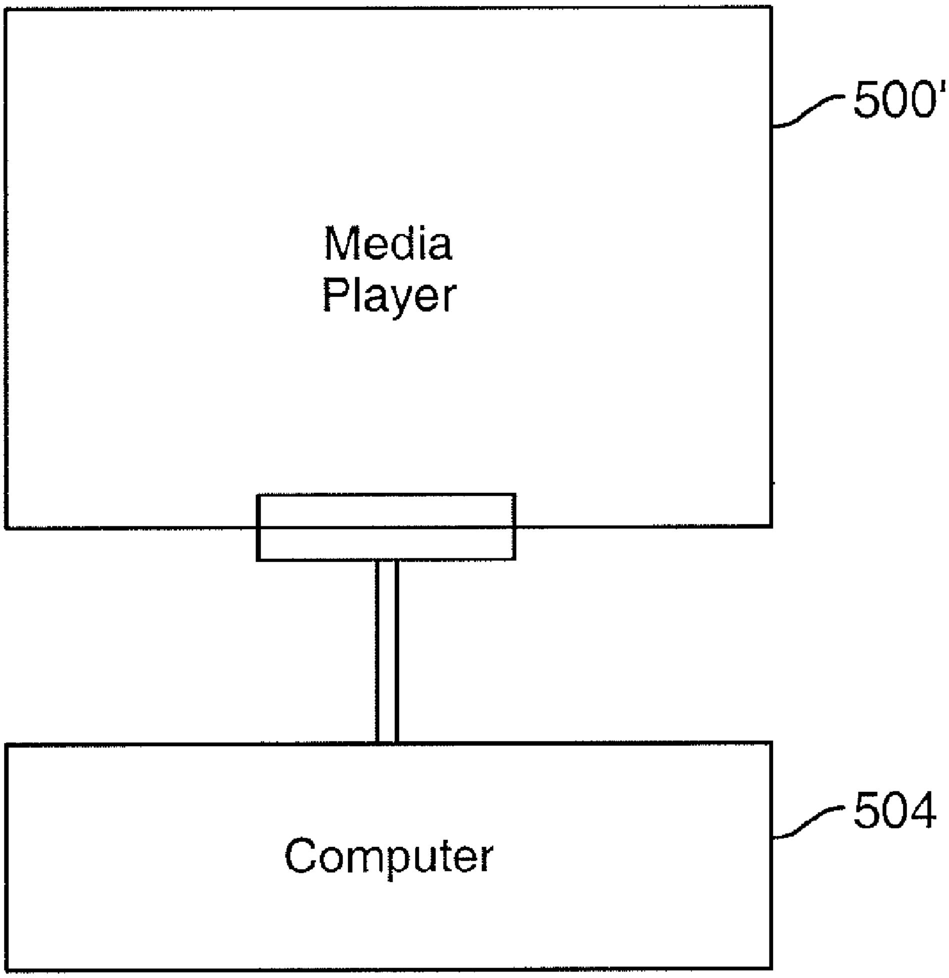
Figure 5C:
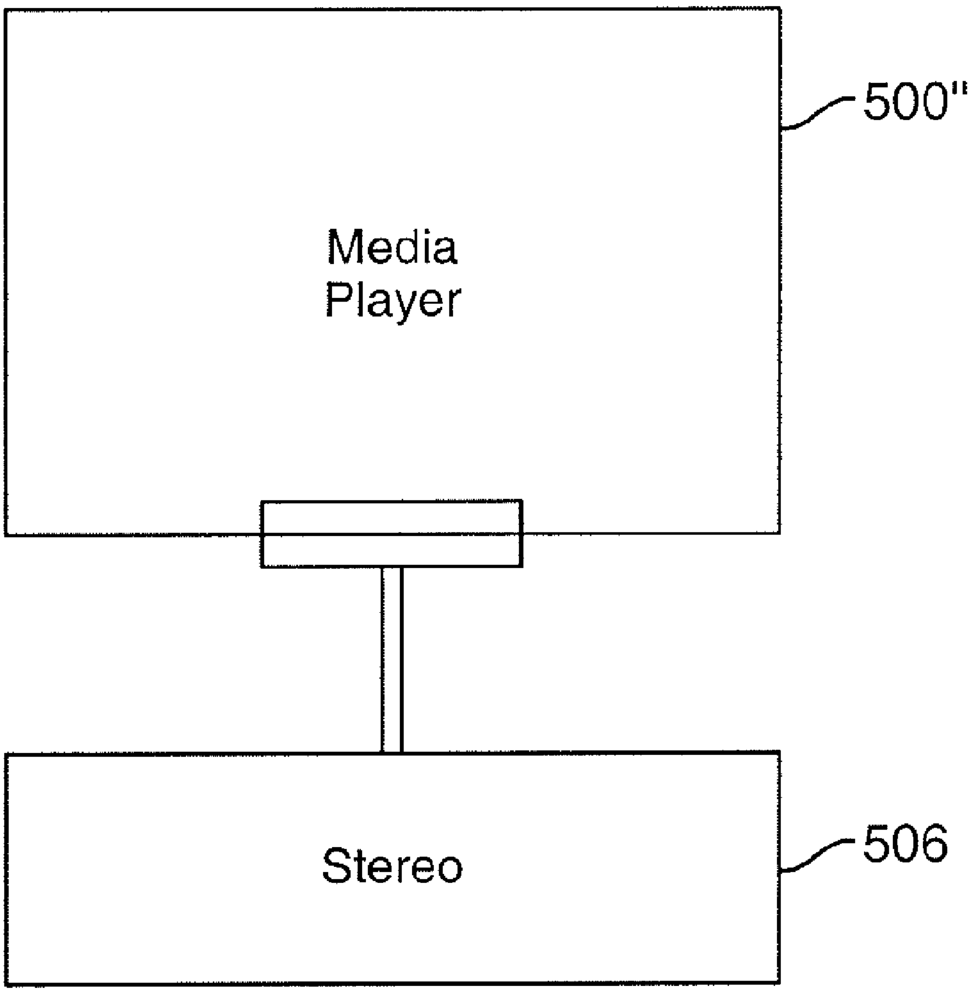
Figure 5D:
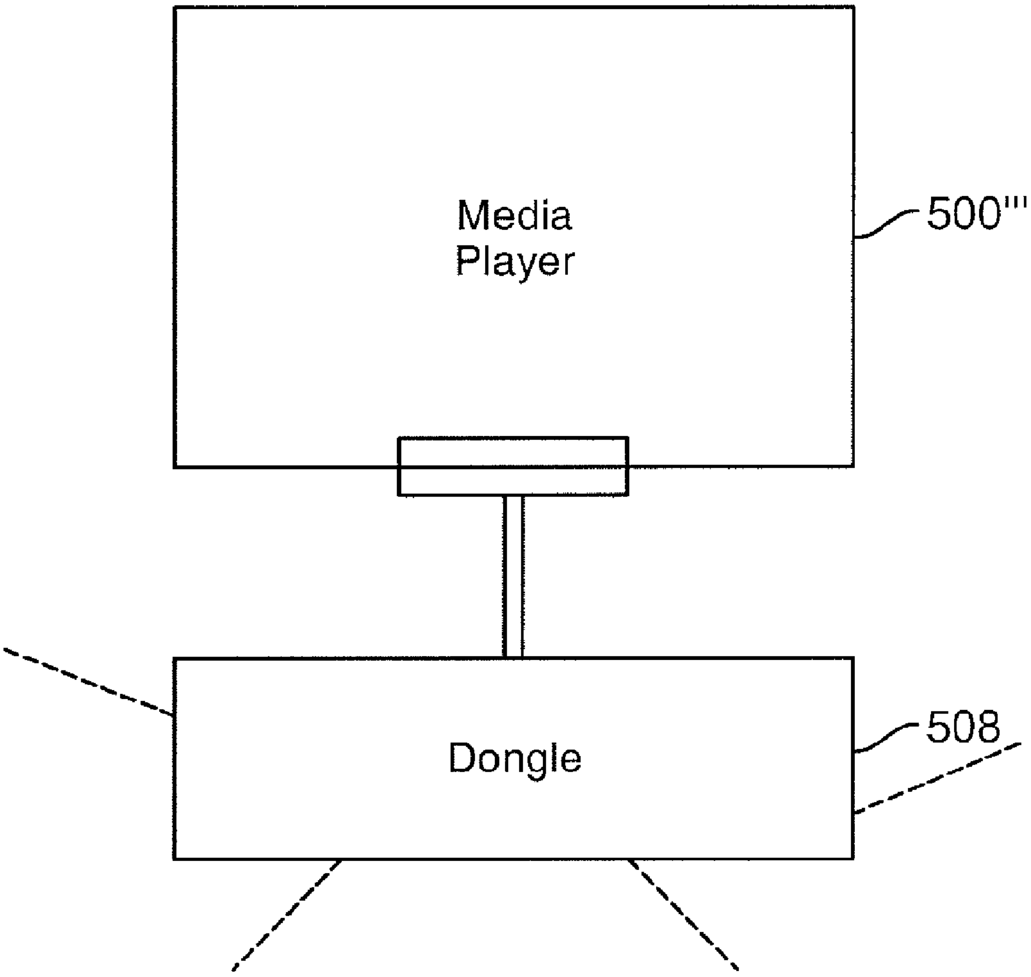
Figure 5E:
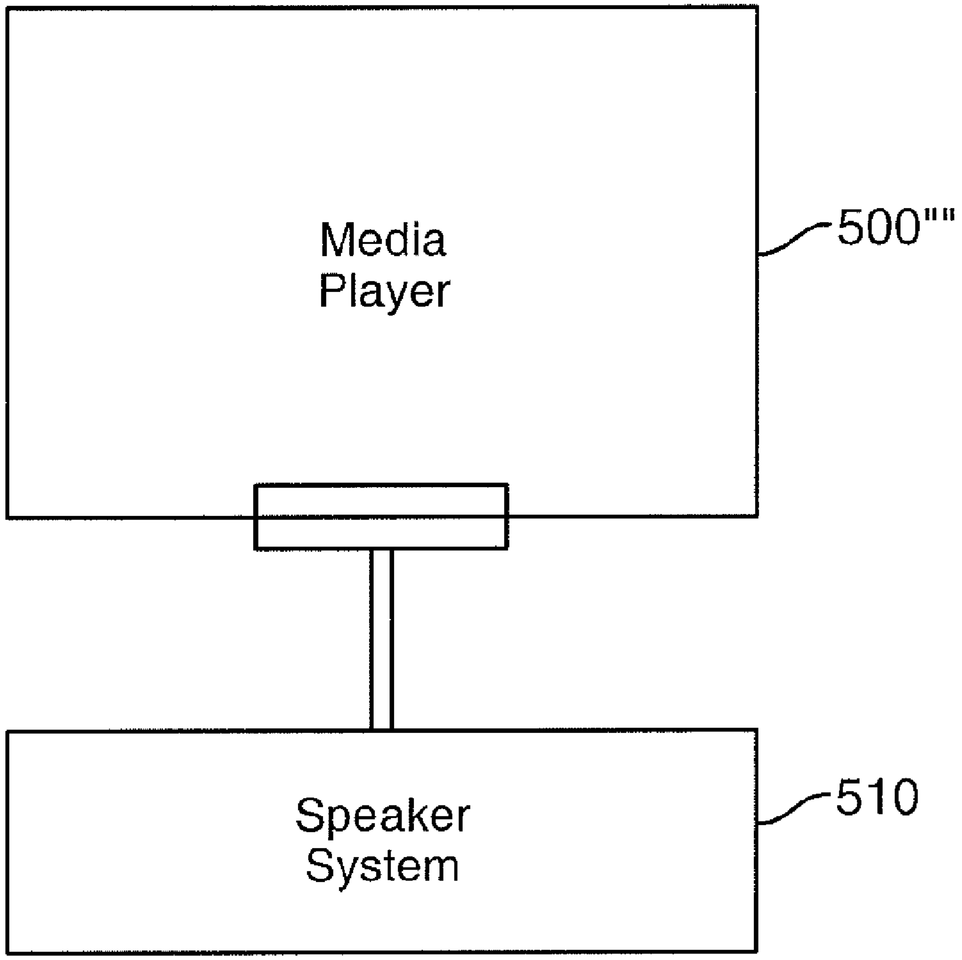

Media players connect to a variety of accessories. FIGS. 5A-5E illustrates a media player 500 coupled to different accessories. FIG. 5A illustrates a media player 500 coupled to a docking station 502. FIG. 5B illustrates the media player 500' coupled to a computer 504. FIG. 5C illustrates the media player 500" coupled to a car or home stereo system 506. FIG. 5D illustrates the media player 500''' coupled to a dongle 508 that communicates wirelessly with other devices. FIG. 5E illustrates the media player 500"" coupled to a speaker system 510. As is seen, what is meant by accessories includes but is not limited docking stations, chargers, car stereos, microphones, home stereos, computers, speakers, and devices which communicate wirelessly with other devices.

Accordingly a single media player must be able to communicate with different devices having varying functionality. To allow for this communication to be handled efficiently in a system and method in accordance with the present invention, a protocol is provided. As part of the connector interface system and in conjunction with the connectors, the protocol allows for the media player to identify the type of accessory that the media player is connected to and also allows the media player to identify the functionality of the accessory. In so doing the media player can efficiently and effectively interact with the accessory in the appropriate manner.

The Media Player Accessory Protocol (MPAP) allows the media player to communicate with a functional range of external devices. The protocol can be broken into three logical components: the protocol transport link, the protocol core, and the individual accessory lingoes. Devices can use USB and UART serial interfaces as channels to transfer MPAP packets. The protocol core describes the components necessary for communication with all external devices. It includes the basic packet definition and the general lingo, which allows for accessory identification, authentication, and retrieval of media player information. The accessory lingoes comprise the individual dialect commands. Each accessory lingo corresponds to a functional class of external devices.

Every external device must support a protocol transport link, the protocol core, and one or more lingoes, as required for its function. For example, the media player standard in-line remote control is a UART serial device that uses the general lingo and the simple remote lingo. To describe these features in more detail refer now to the following.

Protocol Transport Links

Accessories may communicate with the media player, using MPAP over the serial port link or the USB port link. Those links are described below.

UART Serial Port Link

Accessories using the Media Player Accessory Protocol (MPAP) over the UART serial port link use two pins, RX and TX, to communicate to and from the media player.

A device coupled to the docking connector allows for a standard serial protocol to be utilized. Attaching a serial dock accessory makes any top-attached (remote connector) accessories inactive.

The MPAP builds upon an existing serial specification such as the RS-232 serial specification. However, the signaling levels are non-standard. The RS-232 specification states that a mark is −7V and a space is +7V. In MPAP protocol, for example, a mark may be 2.85 V through 3.465 V and a space is 0 V through 0.9 V.

USB Port Link

The media player, for example, may be a USB 2.0-compliant device that supports two mutually exclusive modes of operation:

Mass storage device. This is the default configuration when attached to a typical USB host such as a PC or Macintosh. This mode is used for synching music and content, transferring files, and so forth.

MPAP enabled device. This is the configuration needed to support MPAP using the Media Player USB Interface (MPUI). This mode must be selected by the USB host before it can be used.

These two mutually exclusive modes of operation are each represented by a USB configuration. When the media player is attached to USB, the USB host (the accessory) must select one of the configurations and set it as the active configuration during the bus initialization.

Accessory Identify Resistor and MPUI

There are two types of media player accessories: serial accessories that communicate with the media player using MPAP and resistor-based accessories that need access to specific media player behaviors.

Resistor-based accessories use an Accessory Identify resistor (RID) to get access to a specific media player behavior. These devices tend to be simple accessories, such as battery packs and car chargers, and have one specific purpose. When attached, these accessories unlock media player features based on the RID used. Accessories that communicate with the media player using MPAP are serial accessories. Serial-based accessories may use the other $R_{ID}$ values if they are to be utilized for unlocking a particular resistor-based behavior.

The presence of a $R_{ID}$ of one resistance value on USB attachment triggers the media player to present the MPUI configuration as the first, or default, configuration. The second configuration becomes media player as a Mass Storage class disk device.

For instance, connecting a media player to a standard host, such as a PC or a Macintosh, along with the $R_{ID}$ causes the media player to be set up as a HID device (the HID interface being a component of the MPUI configuration) and not as a disk device. With no resistor, the media player is set up as a disk device.

It is possible to create an accessory that supports both MPAP over USB and the older UART serial-only media players using the same connector.

Media Player USB Interface (MPUI) Configuration

The MPUI configuration allows the media player to communicate using MPAP over USB. The USB Human Interface Device (HID) interface is the transport link and uses two endpoints for communication: the control endpoint is used for OUT data, while the HID interrupt endpoint is used for IN data.

The media player HID interface utilizes several vendor-specific HID reports, some of which are used to transport data from the host and some of which are used to transport data to the host. The HID report sizes range from a few bytes to several hundred KB and each one has a unique identifier. In order to send data to the media player, a host chooses one or more appropriately-sized HID reports in which to embed the MPAP packet and sends this to the media player HID interface with USB Set-Report command. The media player reassembles the MPAP packed and processes it. The process is repeated in reverse when the media player sends responses or MPAP packets to the host.

HID as a Transport

As mentioned earlier, the HID interface breaks MPAP packets up into a stream of vendor-specific HID reports and transports them across USB in either direction. To help manage this, it breaks this stream up into logical sets of reports, where a set of reports encompasses one or more complete MPAP packets. For instance, a set could be a single HID report containing one MPAP packet or a set of HID reports containing a total of 3 MPAP packets.

The HID Report ID indicates the type of report and implies the size of the report. Every report of a given type is the same size. The media player specifies several different report types. The USB host should analyze the HID report descriptor of the media player at runtime to determine which Report ID corresponds to the most appropriate report type for each transfer.

A representative group of lingoes for the media player are listed below.

Lingo Specifications
Lingo
General
Microphone
Simple Remote
Display Remote
Extended Interface
RF transmitter The general lingo is shared for housekeeping commands across all devices. In addition to the general lingo, an accessory will implement a function specific lingo. The microphone lingo is used by the remote connector on the multi-communication device. The simple remote lingo is used by a standard in-line remote control. The display remote lingo is reserved for a device with similar functionality to the standard remote but with a display for status. The RF transmitter lingo is used for devices that transmit the device analog audio over radio frequencies. To describe the lingoes in more detail, refer now to the following discussion in conjunction with the accompanying figures.

General Lingo Command Summary

Table 1 provides a summary of all commands in the general lingo, including whether or not device authentication is required for use of the command.

TABLE 1

| Command | Authentication Required |
|---|---|
| Request Identify | No |
| RequestMediaPlayerName | No |
| RequestMediaPlayerSoftwareVersion | No |
| RequestMediaPlayerSerialNum | No |
| RequestMediaPlayerModelNum | No |
| RequestLingoProtocolVersion | No |
| Identify | No |
| IdentifyAccessoryLingoes | No |
| ACK | No |
| AckDevAuthenticationInfo | No |
| AckDevAuthenticationStatus | No |
| AckMediaPlayerAuthenticationInfo | No |
| AckMediaPlayerAuthenticationStatus | N/A |
| ReturnMediaPlayerName | No |
| ReturnMediaPlayerSoftwareVersion | No |
| ReturnMediaPlayerSerialNumber | No |
| ReturnLingoProtocolVersion | No |
| RetDevAuthenticationInfo | No |
| RetDevAuthenticationSignature | No |
| RetMediaPlayerAuthenticationInfo | No |
| RetMediaPlayerAuthenticationSignature | No |
| GetDevAuthenticationInfo | No |
| GetDevAuthenticationSignature | No |
| GetMediaPlayerAuthenticationInfo | No |
| GetMediaPlayerAuthenticationSignature | No |
| NotifyMediaPlayerStateChange | No |

To identify itself, an accessory should send either an Identify command or an IdentifyAccessoryLingoes command. Accessory devices that support more than one lingo, not including the general lingo, should use the IdentifyAccessoryLingoes command.

The media player may send a RequestIdentify command to the device to ask to re-identify itself.

The remaining general lingo commands can be used to obtain general information from the media player. These commands allow the device to request the name, serial number, model number, and software version number of the media player. The RequestLingoProtocolVersion command allows a device to query the media player for the lingo protocol versions of all supported lingoes on the media player. The ACK command is used by the media player to report command error conditions and has an ACK pending feature to notify the requesting device how long to wait for responses to certain commands.

An accessory may send a RequestLingoProtocolVersion command, to determine which features the connected media player supports. If the media player does not respond to the RequestLingoProtocolVersion command, the device should try the command once more. If no response is received the second time, the device should assume that the connected media player supports the only RequestIdentify and Identify General Lingo commands.

Figure 6:
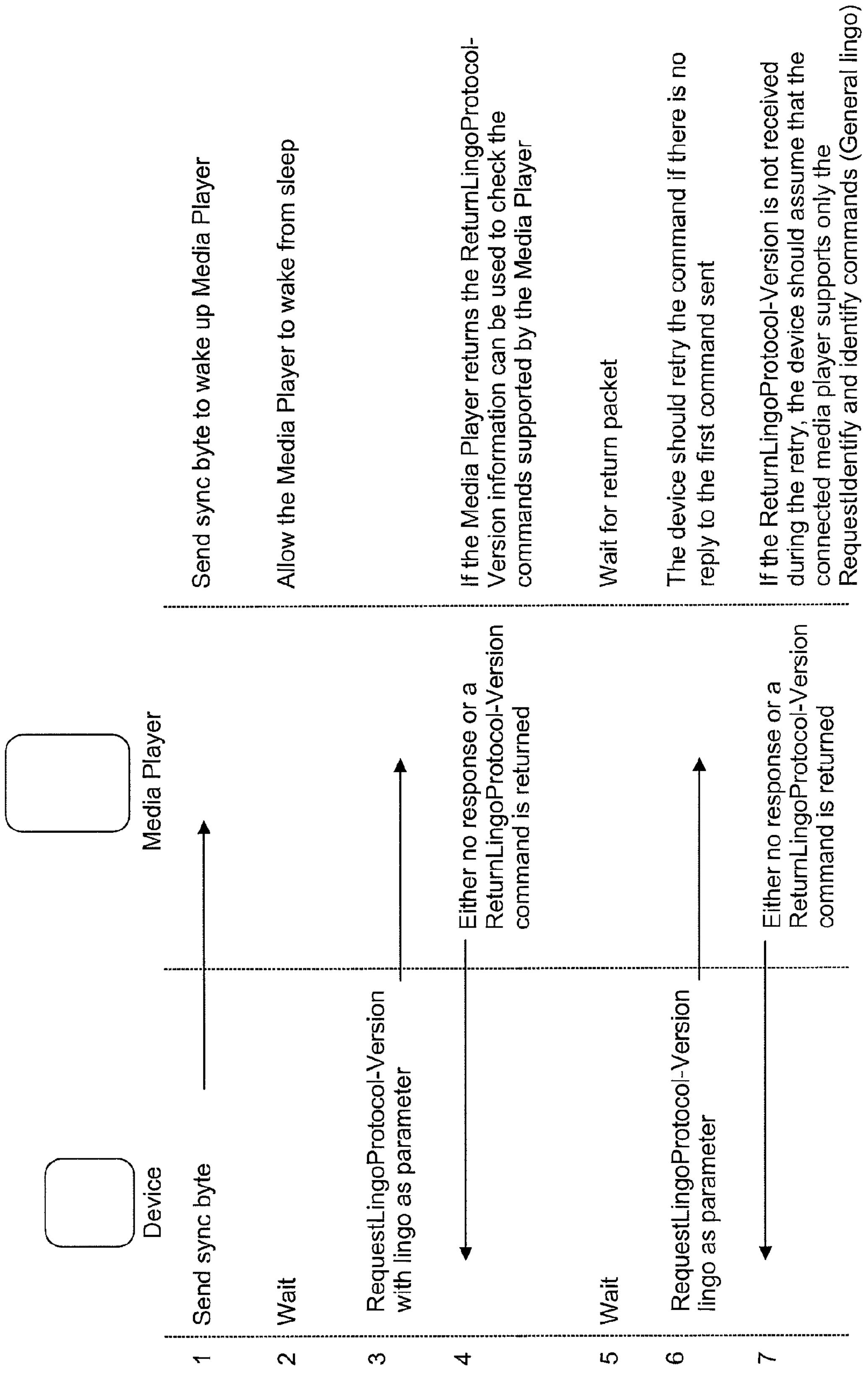
FIG. 6 illustrates the sequence of events that can be utilized to test for the full set of general lingo commands.

FIG. 6 shows the sequence of the events that can be used to test for the full set of general lingo commands. As is seen, first a sync byte is sent to wake up the media player, then allow the media player allowed to wake from sleep. If the media player returns the ReturnLingoProtocolVersion command, then the general lingo version information can be used to check the commands supported by the media player, Next, wait for return packet and the device should retry the command if there is no reply to the first command send. If the ReturnLingoProtocolVersion command is not received during the retry, the device should assume that the connected media player supports only the RequestIdentify and Identify commands. This assumes the accessory device is connected and has already been through the identification process.

General Lingo Command Details

This section describes the general lingo commands and their packet formats.

Request Identify Command

Direction: media player→accessory

The media player sends this command to prompt accessories to re-identify themselves. If an accessory receives this command, it should respond with either the IdentifyAccessoryLingoes command or the Identify command. Accessories that require authentication or use the USB transport link, or support multiple lingoes should respond using the IdentifyAccessoryLingoes command.

Identify Command

Direction: accessory→media player

The accessory must send this command to notify the media player that an accessory has been attached and to register the lingo it supports. Accessories should identify at boot time and any time they receive a RequestIdentify command from the media player.

The Identify command has facilities for RF Transmitter devices to draw more than a predetermined amount of power (such as 4 mA) from the media player.

ACK Command

Direction: media player→accessory

The media player sends the ACK command to notify the device of command completion status and errors.

RequestMediaPlayerSoftwareVersion Command

Direction: media player→accessory

Retrieves the software version for the media player. The media player responds with a ReturnMediaPlayerSoftwareVersion command containing the major, minor, and revision version numbers.

ReturnMediaPlayerSoftwareVersion Command

Direction: media player→accessory

The media player sends this command in response to the RequestMediaPlayerSoftwareVersion command message from the accessory. The media player returns each version number as an individual byte, with the major version number sent first.

RequestMediaPlayerName Command

Direction: accessory→media player

Retrieves the name of the media player. The media player responds with a ReturnMediaPlayerName command containing the name of the media player.

ReturnMediaPlayerName Command

Direction: media player→accessory

The media player sends this command in response to the RequestMediaPlayerName command message from the accessory.

RequestMediaPlayerSerialNum Command

Direction: accessory→media player

Retrieves the serial number string of the media player. The media player responds with a ReturnMediaPlayerSerialNumber command containing the serial number.

ReturnMediaPlayerSerialNum Command

Direction: media player→accessory

The media player sends this command in response to the RequestMediaPlayerSerialNumber command message from the accessory.

RequestMediaPlayerModelNum Command

Direction: accessory→media player

Retrieves information for the media player. The media player responds with a ReturnMediaPlayerModelNum command containing the model number of the media player.

ReturnMediaPlayerModelNum Command

Direction: media player→accessory

The media player sends this command in response to the RequestMediaPlayerModelNum command message from the accessory.

IdentifyAccessoryLingoes Command

Direction: accessory→media player

The accessory sends this command to signal its presence and to identify its supported lingoes. In response, the media player sends an ACK command. The IdentifyAccessoryLingoes command is used by multi-lingo accessories to report all supported lingoes and should be used in place of the Identify command.

GetDevAuthenticationInfo Command

Direction: media player→accessory

The media player sends this command to obtain authentication information from the accessory. The command is sent if and only if the accessory has indicated that it supports authentication in its IdentifyAccessoryLingoes Options bits and has passed a valid, non-zero accessory ID. In response, the accessory sends a RetDevAuthenticationInfo command.

RetDevAuthenticationInfo Command

Direction: accessory→media player

The accessory indicates the MPAP authentication version that it supports by returning this command in response to a GetDevAuthenticationInfo command from the media player.

AckDevAuthenticationInfo Command

Direction: media player→accessory

The media player sends this command in response to RetDevAuthenticationInfo command. It indicates the current state of the accessory authentication information.

RequestLingoProtocolVersion Command

Direction: accessory→media player

Retrieves version information for any of the lingoes supported by the media player.

The media player responds with a ReturnLingoProtocolVersion command containing the major and minor version information of the requested media player lingo.

ReturnLingoProtocolVersion Command

Direction: media player→accessory

The media player sends this command in response to the RequestLingoProtocolVersion command message from the accessory. The major and minor version information for the requested lingo are returned.

GetDevAuthenticationSignature Command

Direction: media player→accessory

The media player sends this command to authenticate a accessory that has identified itself as requiring authentication. Authentication occurs either immediately upon identification or when the accessory attempts to use a restricted lingo or command. The accessory calculates its digital signature based on the challenge offered by the media player and sends the results back to the media player using a RetDevAuthenticationSignature command.

If the returned signature cannot be verified, the media player responds with a non-zero AckDevAuthenticationStatus command, followed immediately by another GetDevAuthenticationSignature command.

RetDevAuthenticationSignature Command

Direction: accessory→media player

The accessory sends this command to the media player in response to GetDevAuthenticationSignature command. The media player verifies the digital signature, calculated by the accessory based on the offered challenge. If verification passes, the media player authenticates the accessory and updates its lingo and command access permissions accordingly. The authentication status is sent to the accessory using AckDevAuthenticationStatus command.

AckDevAuthenticationStatus Command

Direction: media player→accessory

The media player sends this command to the accessory in response to the RetDevAuthenticationSignature command. It indicates the current accessory authentication state. If the accessory receives a non-zero status, the accessory has failed authentication and will only be able to use unauthenticated lingo commands.

If the accessory receives a zero status, the media player has successfully authenticated the accessory. The accessory may then use the requested authenticated lingoes and commands. Optionally, the accessory may begin the process of authenticating the media player, by sending a GetMediaPlayerAuthentication command.

GetMediaPlayerAuthenticationSignature Command

Direction: accessory→media player

The accessory uses this command to send an offered challenge to the media player for digital signature. In response, the media player returns its signed challenge to the accessory using RetMediaPlayerAuthenticationSignature command. Accessories should implement the authentication retry feature described in GetDevAuthenticationSignature command.

RetMediaPlayerAuthenticationSignature Command

Direction: media player→accessory

The media player sends this command to the accessory in response to a Get MediaPlayerAuthenticationSignature command. The accessory verifies the digital signature, calculated by the media player based on the offered challenge, and, if verification passes, authenticates the media player. The accessory sends the authentication status to the media player.

AckMediaPlayerAuthenticationStatus Command

Direction: accessory→media player

The accessory sends this command to the media player in response to RetMediaPlayerAuthenticationSignature command. It indicates the current media player authentication state. The accessory should return a non-zero ACK for each failed authentication attempt.

GetMediaPlayerAuthenticationInfo Command

Direction: accessory→media player

The accessory sends this command to obtain authentication information from the media player. The media player should send this command only if the accessory has indicated that it supports authentication in its IdentifyAccessoryLingoes command options bits and the media player has successfully completed the authentication process. In response, the media player sends RetMediaPlayerAuthenticationInfo command.

AckMediaPlayerAuthenticationInfo Command

Direction: accessory→media player

The accessory sends this command to the media player in response to RetMediaPlayerAuthenticationInfo command. It indicates the current state of the media player information version. If the accessory sends a non-zero status, it indicates that it will not be able to authenticate the media player due to a protocol version or authentication index mismatch.

NotifyMediaPlayerStateChange Command

Direction: media player→accessory

The media player sends this notification command when the media player state is about to change to accessories that identify using IdentifyAccessoryLingoes command. If the accessory identifies using Identify command, this notification is not sent. The state change byte indicates the specific media player state transition. If the media player is switching from a power on state to a light sleep state, accessories must immediately reduce their power consumption below the maximum current such as 5 mA. When the media player has transitioned to a deep sleep or hibernate state, self-powered accessories are expected to automatically re-identify themselves when accessory power is restored.

Microphone Lingo Command

The microphone lingo enables combination microphone and speaker accessory devices to record and playback audio. Media player mass storage disk capacities enable the option of supporting a stereo input mode and higher audio sample rates. Media players may therefore be used for high-quality mobile audio recording.

When the media player detects a device speaking the microphone lingo, it may transition into a recorder application where it can create and manage recordings. Based on the microphone device capabilities, the media player recording application may choose to change its appearance based on the presence or absence of certain microphone features. The device should indicate its capabilities to the media player on request. These capabilities may include:

Stereo line input source

Stereo/mono control

Recording level control

Recording level limiter

Microphone accessories can draw power from the media player or supply power to the media player. Accessory device power management is important as media players transition to a smaller physical size at the same time as trying to extend battery life. As an accessory using the microphone lingo, the microphone accessory will be notified of media player state changes, such as transitioning to the power on, light sleep, hibernate, and deep sleep states. Accessory power is in low mode by default and is raised to high power mode only during recording and playback states.

The microphone accessory is responsible for keeping the power consumption below the maximum allowed limits for each media player state. Note that accessory power is completely shut off when the media player enters the hibernate and deep sleep states. When waking from a light sleep state, the microphone accessory is required to re-identify and re-authenticate itself, as with other accessories using authenticated lingoes or commands. On reset or power up, the accessory device should be in low power state (for example, consuming less than 5 mA) with the amplifier off (audio input and output disabled).

Microphone state information is typically retained locally by the accessory player while uninterrupted accessory power (either high or low power) is available. If accessory power is turned off, device state information may be lost. Accessories are not expected to retain state information across accessory power down cycles (hibernate or deep sleep modes).

Media player playback volume level changes may require the accessory to support display remote lingo functionality.

Table 2 lists the commands available as part of the microphone lingo.

TABLE 2

| Command | Connector | Authentication Required |
|---|---|---|
| BeginRecord | Audio/Remote | No |
| EndRecord | Audio/Remote | No |
| BeginPlayback | Audio/Remote | No |
| EndPlayback | Audio/Remote | No |
| ACK | 30-pin | Yes |
| GetDevAck | 30-pin | Yes |
| MediaPlayerModeChange | 30-pin | Yes |
| GetDevCaps | 30-pin | Yes |
| RetDevCaps | 30-pin | Yes |
| GetDevCtrl | 30-pin | Yes |
| RetDevCtrl | 30-pin | Yes |
| SetDevCtrl | 30-pin | Yes |

BeginRecord Command

Direction: media player→accessory

The media player sends this command to notify the accessory that audio recording has started. The accessory does not return a packet to the media player in response to this command.

EndRecord Command

Direction: media player→accessory

The media player sends this command to notify the accessory that audio recording has ended. The accessory does not return a packet to the media player in response to this command.

BeginPlayback Command

Direction: media player→accessory

The media player sends this command to notify the accessory that audio playback has started. The accessory does not return a packet to the media player in response to this command.

EndPlayback Command

Direction: media player→accessory

The media player sends this command to notify the accessory that audio playback has ended. The accessory does not return a packet to the media player in response to this command.

ACK Command

Direction: accessory→media player

The microphone accessory sends this command in response to a command sent from the media player. Note that some commands do not require an ACK response. The accessory sends an ACK response when a command that does not return any data has completed, a bad parameter is received, or an unsupported or invalid command is received.

GetDevAck Command

Direction: media player→accessory

The media player sends this command to get an ACK response from a microphone accessory. The media player uses this command to "ping" the accessory and determine that it is present and ready to accept commands. In response, the accessory sends the ACK command with command status OK.

MediaPlayerModeChange Command

Direction: media player→accessory

The media player sends this command to the microphone accessory when an audio recording or playback event occurs. The microphone accessory uses the MediaPlayerModeChange command to configure its inputs or outputs and power consumption level for the specified mode. In response, the accessory sends the ACK command with the command status OK. The accessory sends the ACK command when the accessory has completed its mode change.

GetDevCaps Command

Direction: media player→accessory

The media player sends this command to the microphone accessory to determine the features present on the accessory. In response, the accessory sends RetDevCaps command with the payload indicating the capabilities it supports.

RetDevCaps Command

Direction: accessory→media player

The accessory sends this command in response to the command GetDevCaps command sent by the media player. The microphone accessory returns the payload indicating which capabilities it supports.

GetDevCtrl Command

Direction: media player→accessory

The media player sends this command to get the accessory control state for the specified control type. In response, the accessory sends RetDevCtrl command with its current control state. If this command is not supported by the accessory—that is, if the microphone does not have any configurable controls—it should return an ACK command with a bad parameter error status.

RetDevCtrl Command

Direction: accessory→media player

The accessory sends this command in response to the command GetDevCtrl command received from the media player. The accessory returns the current control state for the specified control type. Control types are only supported if the associated capabilities bits are set in the command RetDevCaps command.

SetDevCtrl Command

Direction: media player→accessory

The media player sends this command to set the accessory control state for the specified control type. In response, the accessory sends the ACK command with the command status. If this command is not supported by the accessory—that is, if the microphone does not have any configurable controls—it should return an ACK command with a bad parameter error status.

Simple Remote Lingo

A simple remote accessory sends a buttons status command to indicate an updated status of which buttons are held down. The data of the packet is a number of bytes indicating which buttons are currently held down. In one embodiment, the bytes are made up by ORing the masks of the buttons together. The accessory will send a command to indicate all buttons are released. While any buttons are held down the accessory should repeat this packet on a predetermined interval. If no packet of this sort is received by the host for a predetermined time period, the host may assume a packet was lost and go to "all buttons up" mode.

When the user presses and holds down a button, a simple remote accessory should generate the button status packet immediately and repeat it for as long as the button is pressed. If a second button is pressed while the first button is down, the button status packet sent by the accessory should include status for both buttons, and this packet should be repeated for as long as both buttons are held down. Table 3 lists the possible media player button states.

Simple Remote Button Map

TABLE 3

| Button | Number |
|---|---|
| Play/Pause | 0 |
| Volume Up | 1 |
| Volume Down | 2 |
| Next Track | 3 |
| Previous Track | 4 |
| Next Album | 5 |
| Previous Album | 6 |
| Stop | 7 |
| Play/Resume | 8 |
| Pause | 9 |
| Mute toggle | 10 |
| Next Chapter | 11 |
| Previous Chapter | 12 |
| Next Playlist | 13 |
| Previous Playlist | 14 |
| Shuffle setting advance | 15 |
| Repeat setting advance | 16 |
| Power On | 17 |
| Power Off | 18 |
| Backlight for 30 seconds | 19 |
| Begin FF | 20 |
| Begin REW | 21 |
| Menu | 22 |
| Select | 23 |
| Up Arrow | 24 |
| Down Arrow | 25 |

Some media player button states are interpreted differently by the media player when pressed and held down. These are as follows:

- The Next Track button is treated as a Scan Forward button when pressed and held while a track is playing.
- The Previous Track button is treated as a Scan Backward button when pressed and held while a track is playing.
- The Play/Pause button is treated as a Power Off button when pressed and held.
- The Menu button is treated as a Display Backlight On/Off button when pressed and held.
- If the media player is in Browse mode, the Select button is treated as an Add Track to On-The-Go Playlist button when pressed and held.

Repeated Next Track and Previous Track commands (see Table 3) without an intervening button status packet indicating all buttons are up, are interpreted as Fast Forward and Rewind commands. For a locking Fast Forward or Rewind button, use the Begin Fast Forward or Begin Rewind commands to start the operation and a Play/Resume command to return to the play state.

The Next and Previous Album commands (see Table 3) have no effect if there is no next or previous album to go in to the Now Playing list.

Below is the command for the simple remote lingo.

ContextButtonStatus Command

Direction: Accessory→media player

The accessory sends this command to the media player when a button event occurs. When all buttons are released, the accessory should send a button status packet with a 0x0 payload to indicate that no buttons are pressed. The media player does not return a packet to the accessory in response to this command.

Display Remote Lingo

The display remote lingo is for accessories that need to control the state of the media player, recreate a portion of the media player UI on a remote display, or control the state of the media player equalizer (EQ). The display remote protocol can be used by simple inline-display remotes (remotes that have single-line display and play control buttons) and more complex accessories that have full multi-line graphical displays to show information about the track, artist, or album; current play or pause state; track position; battery; shuffle and time. By supporting multiple lingoes, an accessory can use the display remote lingo in combination with other lingoes to create a fully functional product. Accessories can also use this lingo to control the state of the media player equalizer. The display remote lingo supports serial accessories attached to the Audio/Remote or 30-pin connector.

The display remote command set uses a single byte command format similar to the general and simple remote lingoes. Accessories using the display remote lingo can identify using the general lingo, with either the identify single lingo or IdentifyAccessoryLingoes multiple lingo commands.

Table 4 illustrates the commands for the display remote lingo.

TABLE 4

| Command |
|---|
| ACK |
| GetCurrentEQProfileIndex |
| RetCurrentEQProfileIndex |
| SetCurrentEQProfileIndex |
| GetNumEQProfiles |
| RetNumEQProfiles |
| GetIndexedEQProfileName |
| RetIndexedEQProfileName |
| SetRemoteEventNotification |
| RemoteEventNotification |
| GetRemoteEventStatus |
| RetRemoteEventStatus |
| GetMediaPlayerStateInfo |
| RetMediaPlayerStateInfo |
| SetMediaPlayerStateInfo |
| GetPlayStatus |
| RetPlayStatus |
| SetCurrentPlayingTrack |
| GetIndexedPlayingTrackInfo |
| RetIndexedPlayingTrackInfo |
| GetNumPlayingTracks |
| RetNumPlayingTracks |
| GetPowerBatteryState |
| RetPowerBatteryState |
| GetSoundCheckState |
| RetSoundCheckState |
| SetSoundCheckState |

The commands, their direction and their functions are described in detail hereinbelow.

ACK Command

Direction: media player→accessory

The media player sends this command to acknowledge the receipt of a command from the accessory and return the command status. The command ID field indicates the accessory command for which the response is being sent. The command status indicates the result of the command (success or failure).

GetCurrentEQProfileIndex Command

Direction: accessory→media player

Requests the current equalizer (EQ) profile setting index. In response, the media player sends the RetCurrentEQProfileIndex command packet.

RetCurrentEQProfileIndex Command

Direction: media device→accessory

The media accessory sends this command, returning the current equalizer profile setting index, in response to the GetCurrentEQProfileIndex command packet sent by the accessory.

SetCurrentEQProfileIndex Command

Direction: accessory→media player

Set the current equalizer profile setting index and optionally restores the original equalizer setting on accessory detach. The valid equalizer index range can be determined by sending a GetNumEQProfiles command. In response to this command, the media player returns an ACK packet with the status of this command.

GetNumEQProfiles Command

Direction: accessory→media player

Requests the number of media player equalizer profile settings. In response, the media player sends the RetNumEQProfiles command packet.

RetNumEQProfiles Command

Direction: media player→accessory

Returns the number of equalizer profiles. The media player sends this command in response to the GetNumEQProfiles command packet sent by the accessory.

GetIndexedEQProfileName Command

Direction: accessory→media player

Requests the media player equalizer profile setting name for a given equalizer profile index. In response, the media player sends the RetIndexedEQProfileName command packet. The valid profile index range can be obtained by sending the GetNumEQProfiles command.

RetIndexedEQProfileName Command

Direction: media player→accessory

Returns the media player equalizer profile setting name for the specified equalizer profile index in response to the GetIndexedEQProfileName command.

SetRemoteEventNotification Command

Direction: accessory→media player

Enables asynchronous remote event notification for media player events. On accessory detach, event notification is reset to the default disabled state.

RemoteEventNotification Command

Direction: media player→accessory

The media player sends this command asynchronously whenever an enabled event change has occurred. Use the SetRemoteEventNotification command to control which events are enabled.

GetRemoteEventStatus Command

Direction: accessory→media player

Gets the status of state information that has changed on the media player. In response, the media player sends a RetRemoteEventStatus command, containing a bitmask of event states that changed since the last GetRemoteEventStatus command and clears all the remote event status bits. This command may be used to poll the media player for event changes without enabling asynchronous remote event notification.

RetRemoteEventStatus Command

Description: media player→accessory

The media player sends this command in response to the GetRemoteEventStatus command.

GetMediaPlayerStateInfo Command

Direction: accessory→media player

Obtains media player state information. In response, the media player sends a RetMediaPlayerStateInfo command with the requested state information.

RetMediaPlayerStateInfo Command

Direction: media player→accessory

The media player sends this command in response to the GetMediaPlayerStateInfo command.

SetMediaPlayerStateInfo Command

Direction: accessory→media player

Set the media player state. The information type specifies the type of information to update. In response, the media player sends an ACK command with the results of the operation.

GetPlayStatus Command

Direction: accessory→media player

Gets the current media player play status information. In response, the media player sends a RetPlayStatus command with the current play state, track index, track position, and track length.

RetPlayStatus Command

Direction: media player→accessory

The media player sends this command in response to the GetPlayStatus command and returns the current media player play status information.

SetCurrentPlayingTrack Command

Direction: accessory→media player

Sets the currently playing track to the track at the specified index. The total number of playing tracks can be obtained by sending a GetNumPlayingTracks command.

GetIndexedPlaying TrackInfo Command

Direction: accessory→media player

Gets track information for the specified playing track index. The infoType field specifies the type of information to be returned, such as track title, artist title, artist name, album name, track genre, and track chapter information. In response, the media player sends a RetIndexedPlayingTrackInfo command with the requested track information.

RetIndexedPlayingTrackInfo Command

Direction: media player→accessory

The media player sends this command in response to the GetIndexedPlayingTrackInfo command. It returns the requested type of information and data for the specified playing track.

RetNumPlayingTracks Command

Direction: media player→accessory

The media player sends this command in response to the GetNumPlayingTracks command received from the accessory. It returns the total number of tracks queued in the playback engine.

GetPowerBatteryState Command

Direction: accessory→media player

Gets the power and battery level state of the media player. In response, the media player sends a RetPowerBatteryState command with the power and battery information.

RetPowerBatteryState Command

Direction: media player→accessory

The media player sends this command in response to the GetPowerBatteryState command and returns the current media player power state and battery level.

GetSoundCheckState Command

Direction: accessory→media player

Gets the current sound check setting. When enabled, sound check adjusts track playback volume to the same level. In response, the media player sends a RetSoundCheckState command with the current sound check state.

RetSoundCheckState Command

Direction: media player→accessory

The media player sends this command in response to the GetSoundCheckState command and returns the current state of the sound check setting.

SetSoundCheckState Command

Direction: accessory→media player

Sets the state of the sound check setting and optionally saves the previous sound check state to be restored on accessory detach. In response to this command, the media player sends an ACK packet with the status of the command.

Extended Interface Lingo Specification

Operating Modes

The media player can be considered to operate in two major modes, standard UI mode and extended Interface mode.

Standard UI Mode

This is the standard user interface mode and allows the media player to be driven by its front panel display and buttons.

Extended Interface Mode

The media player transitions into the Extended Interface mode when either of the following occurs:

(1)—A single-lingo accessory is connected to the media player and issues the Identify command, specifying the Extended Interface lingo as its supported lingo.

(2)—A multi-lingo accessory is connected to the media player and issues a General Lingo Command EnterRemoteUIMode command.

If the media player is playing a track during this transition, the playback is automatically paused.

The extended interface protocol allows accessories to replace the graphic with a downloaded image set through a SetDisplayImage command. Removing power from the media player while a connection remains results in the media player going into a light sleep state after a predetermined amount of inactivity. The controls of the media player are disabled when in extended interface mode.

The media player transitions back to standard UI mode when any of the following occurs:

(1)—The accessory is disconnected from the media player.

(2)—A multi-lingo accessory issues the General Lingo Command: ExitRemoteUIMode.

The accessory re-identifies itself, using either of the general lingo commands Identify or IdentifyAccessoryLingoes.

If the media player is playing a track during this transition, the playback is automatically paused. Any media player settings with the restore on exit feature state are restored when the media player is disconnected.

Light Sleep State

The media player screen, playback, and most major parts of the media player are off while the media player is in the light sleep state. The media player transitions from extended interface mode to the light sleep state when power is detached and playback is idle. A period of inactivity is required before the media player transitions into the light sleep state. When power is restored, the media player returns to the extended interface mode.

A media player will not sleep while it remains attached to an active USB host. The USB host must switch off its host controller to force a media player in extended interface mode into the light sleep state. If the media player is not currently in extended interface mode, playback must be paused before the host controller is turned off. In extended interface mode, there is no need to pause media playback before turning off the host controller because this action generates a disconnect event that causes the media player to exit the extended interface mode and allows the media player to transition into the light sleep state. Attaching USB power to a media player in light sleep state will wake it up.

Switching Between Standard UI and Extended Interface Modes

There are four general lingo commands that allow accessories to determine what mode the media player is in and to switch between the two major modes, Standard UI and Extended Interface. These commands were implemented to allow a device to switch between modes without having to unplug the accessory. Multi-lingo accessories must use these commands to switch into and out of the extended interface mode.

Table 5 lists the general lingo command codes for querying, entering, and exiting the extended interface protocol.

TABLE 5

| General Lingo command | Requires authentication UART serial port link | Requires authentication USB port link |
|---|---|---|
| RequestRemoteUIMode | No | Yes |
| ReturnRemoteUIMode | No | Yes |
| EnterRemoteUIMode | No | Yes |
| ExitRemoteUIMode | No | Yes |

RequestRemoteUIMode Command

Direction: accessory→media player

Requests the Extended Interface mode from the media player. The media player responds with a ReturnRemoteUIMode command.

ReturnRemoteUIMode Command

Direction: media player→accessory

Returns the current operating mode of the media player UI

EnterRemoteUIMode Command

Direction: accessory→media player

The accessory sends this command to the media player to force it to enter the Extended Interface mode. If the media player is already in the extended interface mode, it immediately returns a general lingo ACK command packet, notifying the user that the command was successful.

ExitRemoteUIMode Command

Direction: accessory→media player

The accessory sends this command to the media player to force it to exit the Extended Interface mode. If the media player is already in the standard UI mode, it immediately returns a general lingo ACK command packet, notifying the user that the command was successful.

Using the Extended Interface Protocol

In order to effectively use the extended interface protocol, there are two logical entities that need to be managed while browsing and playing content: the content database engine and the playback engine. The following describes those engines and gives an example of command traffic between an extended interface accessory and a media player.

The Playback Engine

The playback engine is active when the media player is in a playback state, such as play, fast forward, and rewind. It has a special play list, called the Now Playing playlist, that is used to determine what track or content item will be played next. The PlayCurrentSelection command is used to transfer the currently selected database items to the Now Playing Playlist and start the player at a specified item within that list. Changes to the database selection before or after this PlayCurrentSelection command have no effect on the current playback.

The Database Engine

The database engine is always accessible when the unit is awake. It can be manipulated remotely and allows groups of content items to be selected, independently of the playback engine. This allows the user to listen to an existing track or playlist while checking the media player database for another selection. Once a different database selection is made, the user selection (the track or content playlist) is sent to the playback engine. The commands such as ResetDBSelection and GetNumberCategorizedDBRecords are examples of commands that are used to manipulate the Database Engine.

Database Category Hierarchies

The database engine uses categories to classify music and other records stored in the database. Possible categories are playlist, genre, artist, album, track, composer and audiobook. A list of records can be assembled, based on the various selected categories, to create a user list of records (a playlist).

The database categories have a hierarchy by which records are sorted and retrieved. This category hierarchy has an impact on the order in which records should be selected. For example, if a low category, such as album, is selected first, followed by a higher relative category such as genre, the album selection is invalidated and is ignored. When creating a new set of database selections, the accessory should begin by resetting all database selections, using the ResetDBSelection command, and selecting the desired database categories from highest to lowest relative category. A representation of the database hierarchy is shown in Table 6.

TABLE 6

| Category | Notes |
|---|---|
| All (highest level) | This is the state after a ResetDBSelection command. No database categories are selected. If the GetNumberCategorizedDBRecords command is sent while in this state, it returns the total number of records for the requested category. |
| Playlist | When the SelectDBRecord command selects a playlist, all lower database category selections (genre, artist or composer, album, and track) are invalidated. |
| Genre | When the SelectDBRecord command selects a genre, all lower database category selections (artist or composer, album, and track) are invalidated. |
| Artist or Composer | When the SelectDBRecord command selects an artist or composer, all album and track category selections are invalidated. |
| Album | When the SelectDBRecord command selects an album, all track category selections are invalidated. |
| Song/Audiobook Track (lowest level) | When the Select DBRecord command selects a track, either a song or an audiobook, it is automatically transferred from the Database Engine to the Playback Engine. |

Extended Interface Mode Commands

Table 7 lists the command for the Extended Interface protocol.

TABLE 7

| Command | Target engine |
|---|---|
| Acknowledge | N/A |
| GetCurrentPlaying-TrackChapterInfo | Playback Engine |
| GetCurrentPlaying-TrackChapterInfo | Playback Engine |

TABLE 7-continued

| Command | Target engine |
|---|---|
| GetCurrentPlaying-TrackChapterName | Playback Engine |
| GetAudiobookSpeed | N/A |
| GetIndexedPlaying-TrackInfo | Playback Engine |
| GetNumberCategorized-DBRecords | Database Engine |
| GetPlayStatus | Playback Engine |
| GetCurrentPlaying-TrackIndex | Playback Engine |
| GetIndexedPlaying-TrackTitle | N/A |
| GetIndexedPlaying-TrackArtistName | Playback Engine |
| GetIndexedPlaying-TrackAlbumName | Playback Engine |
| GetShuffle | N/A |
| GetRepeat | N/A |
| GetMonoDisplay-ImageLimits | N/A |
| GetNumPlayingTracks | Playback Engine |
| GetColorDisplay-ImageLimits | N/A |
| ReturnCurrentPlaying-TrackChapterInfo | Playback Engine |
| ReturnCurrentPlaying-TrackChapterPlayStatus | Playback Engine |
| ReturnCurrentPlaying-TrackChapterName | Playback Engine |
| ReturnAudiobookSpeed | N/A |
| ReturnIndexedPlaying-TrackInfo | N/A |
| ReturnProtocolVersion | N/A |
| ReturnMediaPlayerName | N/A |
| ReturnNumber-CategorizedDBRecords | N/A |
| ReturnCategorized-DatabaseRecord | N/A |
| ReturnPlayStatus | N/A |
| ReturnCurrentPlaying-TrackIndex | N/A |
| ReturnIndexedPlaying-TrackTitle | N/A |
| ReturnIndexedPlaying-TrackArtistName | N/A |
| ReturnIndexedPlaying-TrackAlbumName | N/A |
| ReturnShuffle | N/A |
| ReturnRepeat | N/A |
| ReturnMonoDisplay-ImageLimits | N/A |
| ReturnNumPlayingTracks | N/A |
| ReturnColorDisplay-ImageLimits | N/A |
| SetCurrentPlaying-Track Chapter | Playback Engine |
| SetAudiobookSpeed | N/A |
| SetPlayStatusChange-Notification | Playback Engine |
| SetShuffle | N/A |
| SetRepeat | N/A |
| SetDisplayImage | N/A |
| SetCurrentPlayingTrack | Playback Engine |
| RequestProtocolVersion | N/A |
| RequestMediaPlayerName | N/A |
| ResetDBSelection | Database Engine |
| RetrieveCategorized-DatabaseRecords | Database Engine |
| PlayStatusChange-Notification | N/A |
| PlayCurrentSelection | Database and Playback Engines. This command copies items from the database to the Playback Engine. |
| PlayControl | Playback Engine |
| SelectSortDBRecord | Database Engine |

Each of these commands, their direction and function are described hereinbelow.

ACK Command

Direction: media player→accessory

The media player sends this telegram to acknowledge the receipt of a command and return the command status. The command ID field indicates the accessory command for which the response is being sent. The command status indicates the results of the command (success or failure).

GetCurrentPlayingTrackChapterInfo Command

Direction: accessory→media player

Applies to: playback engine

Requests the chapter information of the currently playing track. In response, the media player sends a ReturnCurrentPlayingTrackChapterInfo telegram to the accessory.

ReturnCurrentPlayingTrackChapterInfo Command

Direction: media player→accessory

Returns the chapter information of the currently playing track. The media player sends this telegram in response to the GetCurrentPlayingTrackChapterInfo telegram from the accessory. The chapter information includes the currently playing track's chapter index, as well as the total number of chapters.

SetCurrentPlayingTrackChapter Command

Direction: accessory→media player

Applies to: playback engine

Sets the currently playing track chapter. In response to the SetCurrentPlayingTrackChapter command, the media player sends an ACK telegram with the command status.

GetCurrentPlayingTrackChapterPlayStatus

Direction: accessory→media player

Applies to: playback engine

Requests the chapter playtime status of the currently playing track. In one embodiment the status includes the chapter length and the time elapsed within that chapter. In response to a valid telegram, the media player sends a ReturnCurrentPlayingTrackChapterPlayStatus telegram to the accessory.

ReturnCurrentPlayingTrackChapterPlayStatus Command

Direction: media player→accessory

Returns the play status of the currently playing track chapter. The media player sends this telegram in response to the GetCurrentPlayingTrackChapterPlayStatus telegram from the accessory.

GetCurrentPlayingTrackChapterName Command

Direction: accessory→media player

Applies to: playback engine

Requests a chapter name in the currently playing track. In response to a valid telegram, the media player sends a ReturnCurrentPlayingTrackChapterName telegram to the accessory.

ReturnCurrentPlayingTrackChapterName Command

Direction: media player→accessory

Returns a chapter name in the currently playing track. In response to a valid telegram, the media player sends a ReturnCurrentPlayingTrackChapterName telegram to the accessory.

ReturnCurrentPlayingTrackChapterName Command

Direction: media player→accessory

Returns a chapter name in the currently playing track. The media player sends this telegram in response to a valid GetCurrentPlayingTrackChapterName telegram from the accessory.

GetAudiobookSpeed Command

Direction: accessory→media player

Requests the current media player audiobook speed state. The media player responds with the ReturnAudiobookSpeed telegram indicating the current audiobook speed.

ReturnAudiobookSpeed Command

Direction: mediaplayer→accessory

Returns the current audiobook speed setting. The media player sends this telegram in response to the GetAudiobookSpeed command from the accessory.

Table 8 shows the possible audiobook speed states returned by this command.

TABLE 8

| Value | Meaning |
|---|---|
| 0xFF | Slow (−1) |
| 0x00 | Normal |
| 0x01 | Fast (+1) |
| 0x02-0xFE | Reserved |

SetAudiobookSpeed Command

Direction: accessory→media player

Sets the speed of audiobook playback. The media player audiobook speed states are listed in Table 8. This telegram has two modes: one to set the speed of the currently playing audiobook and a second to set the audiobook speed for all audiobooks.

GetIndexedPlayingTrackInfo Command

Direction: accessory→media player

Applies to: playback engine

Gets track information for the track at the specified index. The track info type field specifies the type of information to be returned, such as song lyrics, podcast name, episode date, and episode description. In response, the media player sends the ReturnIndexedPlayingTrackInfo command.

ReturnIndexedPlayingTrackInfo Command

Direction: media player→accessory

Returns the requested track information type and data. The media player sends this command in response to the GetIndexedPlayingTrackInfo command.

RequestProtocolVersion Command

Direction: accessory→media player

Requests the version of the running Extended Interface protocol from the media player. The media player responds with a ReturnProtocolVersion command.

ReturnProtocolVersion Command

Direction: media player→accessory

Returns the media player Extended Interface protocol version number. The media player sends this command in response to the RequestProtocolVersion command from the accessory.

RequestMediaPlayerName Command

Direction: accessory→media player

Returns the name of the user's media player or "media player" if the media player name is undefined. This allows the media player name to be shown in the human-machine interface.

ReturnMediaPlayerName Command

Direction: media player→accessory

The media player sends this command in response to the RequestMediaPlayerName telegram from the accessory.

ResetDBSelection Command

Direction: accessory→media player

Applies to: database engine

Resets the current database selection to an empty state and invalidates the category entry count. That is, it sets the count to 0 for all categories except the playlist category.

SelectDBRecord Command

Direction: accessory→media player

Applies to: database engine. Selecting a single track automatically passes it to the playback engine.

Selects one or more records in the database engine, based on a category relative index.

GetNumberCategorizedDBRecords Command

Direction: accessory→media player

Applies to: database engine

Retrieves the number of records in a particular database category.

ReturnNumberCategorizedDBRecords Command

Direction: media player→accessory

Returns the number of database records matching the specified database category.

RetrieveCategorizedDatabaseRecords Command

Direction: accessory→media player

Applies to: database engine

Retrieves one or more database records from the media player, typically based on the results from the GetNumberCategorizedDBRecords command query.

ReturnCategorizedDatabaseRecord Command

Direction: media player→accessory

Contains information for a single database record.

GetPlayStatus Command

Direction: accessory→media player

Applies to: playback engine

Requests the current media player playback status, allowing the accessory to display feedback to the user.

ReturnPlayStatus Command

Direction: media player→accessory

Returns the current media player playback status.

GetCurrentPlayingTrackIndex Command

Direction: accessory→media player

Applies to: playback engine

Requests the playback engine index of the currently playing track.

ReturnCurrentPlayingTrackIndex Command

Direction: media player→accessory

Returns the playback engine index of the current playing track in response to the GetCurrentPlayingTrackIndex telegram from the accessory.

GetIndexedPlayingTrackTitle Command

Direction: accessory→media player

Applies to: playback engine

Requests the title name of the indexed playing track from the media player. In response to a valid telegram, the media player sends a ReturnIndexedPlayingTrackTitle telegram to the accessory.

ReturnIndexedPlayingTrackTitle Command

Direction: media player→accessory

Returns the title of the indexed playing track in response to a valid GetIndexedPlayingTrackTitle telegram from the accessory.

GetIndexedPlayingTrackArtistName Command

Direction: accessory→media player

Applies to: playback engine

Requests the name of the artist of the indexed playing track. In response to a valid telegram, the media player sends a ReturnIndexedPlayingTrackArtistName telegram to the accessory.

ReturnIndexedPlayingTrackArtistName Command

Direction: media player→accessory

Returns the artist name of the indexed playing track in response to a valid GetIndexedPlayingTrackArtistName telegram from the accessory.

GetIndexedPlayingTrackAlbumName Command

Direction: accessory→media player

Applies to: playback engine

Requests the album name of the indexed playing track.

ReturnIndexedPlayingTrackAlbumName Command

Direction: media player→accessory

Returns the album name of the indexed playing track in response to a valid GetIndexedPlayingTrackAlbumName telegram from the accessory.

SetPlayStatusChangeNotification Command

Direction: accessory→media player

Applies to: playback engine

Sets the state of play status change notifications from the media player to the accessory.

PlayStatusChangeNotification Command

Direction: media player→accessory

The media player sends this telegram to the accessory when the media player play status changes, if the accessory has previously enabled notifications using the SetPlayStatusChangeNotification command. This telegram contains details about the new play status.

PlayCurrent Selection Command

Direction: accessory→media player

Applies to: playback engine and database engines. This command copies items from the database engine to the playback engine.

Requests playback of the currently selected track or list of tracks.

PlayControl Command

Direction: accessory→media player

Applies to: playback engine

Sets the new play state of the media player.

GetShuffle Command

Direction: accessory→media player

Requests the current state of the media player shuffle setting.

ReturnShugle Command

Direction: media player→accessory

Returns the current state of the shuffle setting.

SetShuffle Command

Direction: accessory→media player

Sets the media player shuffle mode.

GetRepeat Command

Direction: accessory→media player

Requests the track repeat state of the media player.

ReturnRepeat Command

Direction: media player→accessory

Returns the current media track repeat state to the accessory.

SetRepeat Command

Direction: accessory→media player

Sets the repeat state of the media player.

SetDisplayImage Command

Direction: accessory→media player

Sets a bitmap image that is shown on the media player display when it is connected to the accessory.

GetMonoDisplayImageLimits Command

Direction: accessory→media player

Requests the limiting characteristics of the monochrome image that can be sent to the media player for display while it is connected to the accessory.

ReturnMonoDisplayImageLimits Command

Direction: media player→accessory

Returns the limiting characteristics of the monochrome image that can be sent to the media player for display while it is connected to the accessory.

GetNumPlayingTracks Command

Direction: accessory→media player

Applies to: playback engine

Requests the number of tracks in the list of tracks queued to play on the media player.

ReturnNumPlayingTracks Command

Direction: media player→accessory

Returns the number of tracks in the actual list of tracks queued to play, including the currently playing track (if any).

SetCurrentPlayingTrack Command

Direction: accessory→media player

Applies to: playback engine

Sets the index of the track to play in the Now Playing playlist on the media player.

SelectSortDBRecord Command

Direction: accessory→media player

Applies to: database engine

Selects one or more records in the media player database, based on a category-relative index.

GetColorDisplayImageLimits Command

Direction: accessory→media player

Requests the limiting characteristics of the color image that can be sent to the media player for display while it is connected to the accessory.

ReturnColorDisplayImageLimits Command

Direction: media player→accessory

Returns the limiting characteristics of the color image that can be sent to the media player for display while it is connected to the accessory.

RF Transmitter Lingo

The RF Transmitter Lingo is used for accessories that transmit the media player analog audio over radio frequencies (typically an unused frequency in the FM band). The Begin Transmission command packet notifies the external RF transmitter accessory that the media player is entering playback mode. The End Transmission command packet notifies the RF transmitter that the media player is exiting playback mode (that is, it is stopped, entering light sleep mode, and so forth).

Begin Transmission Command

Direction: media player→accessory

The media player sends this command to notify the accessory that high power may be used and that it should begin transmitting.

End Transmission Command

Direction: media player→accessory

The media player sends this command to notify the accessory to stop transmitting and to stop using accessory high power.

Single Lingo Accessory Identification

Figure 7:
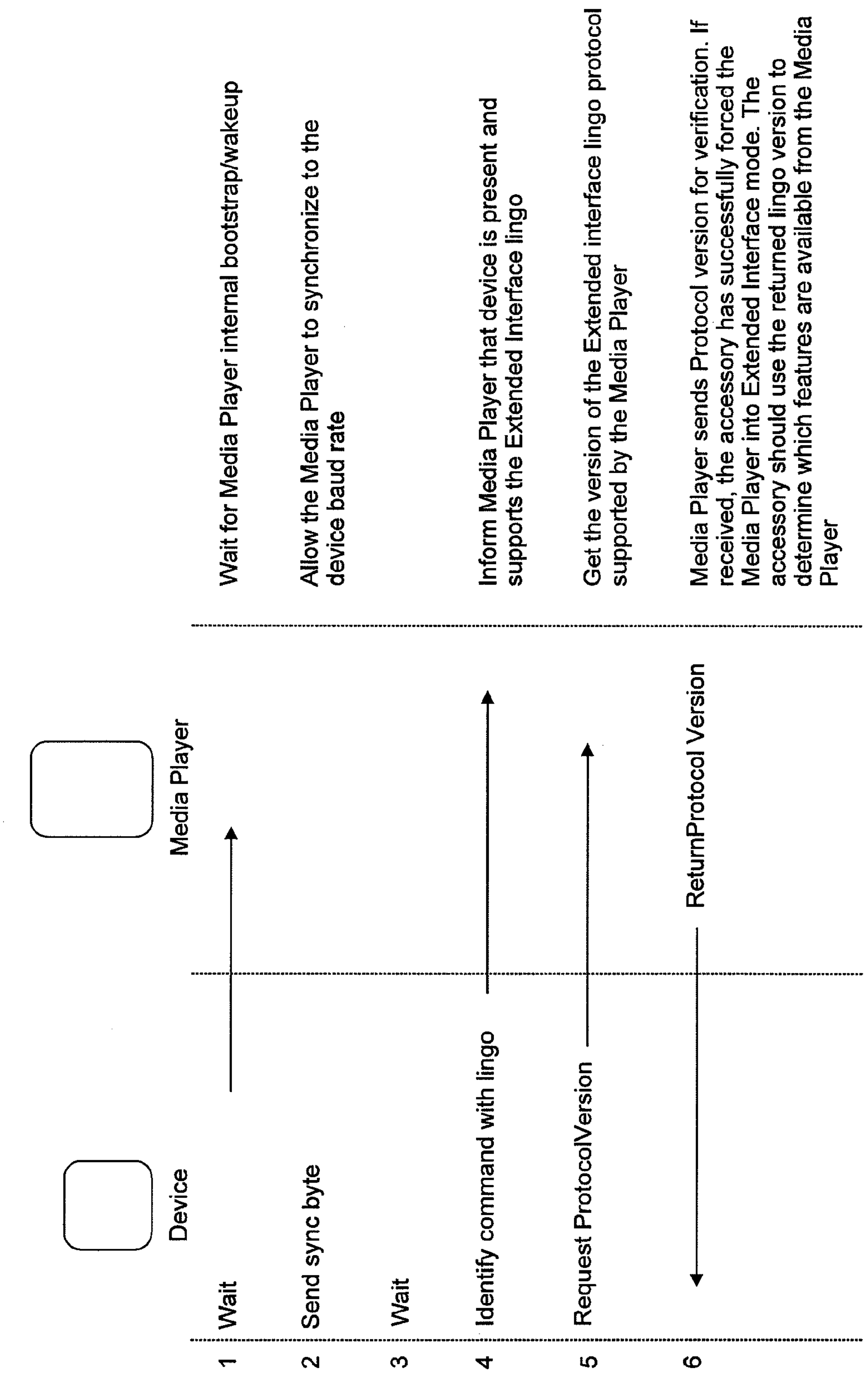
FIG. 7 illustrates a single lingo accessory command flow.

Accessories should use the general lingo identify command to identify themselves as supporting a single accessory lingo. FIG. 7 illustrates a single-lingo accessory command flow. In this command flow, first the accessory waits for media player internal bootstrap/wakeup and allows the media player to synchronize to the accessory rate. Next, the media player is informed that accessory is present and supports the Extended Interface lingo. Thereafter, the accessory gets (requests) the version of the extended interface lingo protocol supported by the media player and the media player sends the protocol version for verification. If received, the accessory has successfully forced the media player into extended interface mode. The accessory should use the returned lingo version to determine which features are available from the media player.

Multiple Lingo Accessory Identification

Accessories should use the general lingo IdentifyAccessoryLingoes command to identify themselves as supporting multiple accessory lingoes (not including the general lingo), or when they are communicating with the media player over the USB port link.

Accessories that support the extended interface mode and identify as a multi-lingo accessory do not automatically switch into the extended interface mode after the identification process completes. These accessories must explicitly switch into and out of the extended interface mode, using the general lingo commands.

Figure 8:
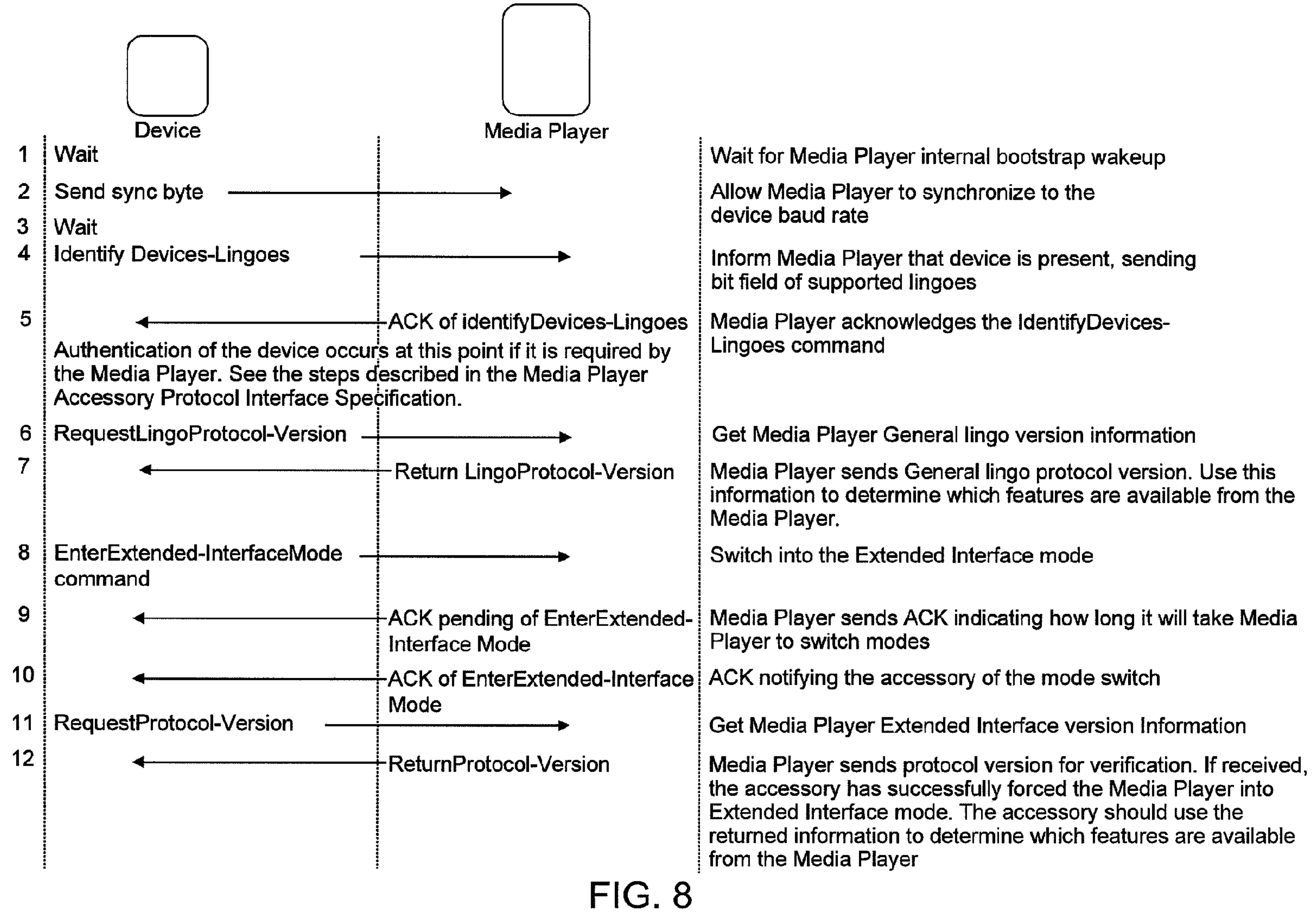
FIG. 8 illustrates a multiple lingo command flow.

Accessories that identify themselves as supporting multiple lingoes should use the steps shown in FIG. 8. FIG. 8 illustrates a multiple lingo command flow. In this flow, first the accessory waits for the media player bootstrap/wakeup and allows the media player to synchronize to the accessory rate. Next, the media player is informed that the accessory is present, and the bit field of supported lingoes is sent. The media player acknowledges the IdentifyAccessoriesLingos command. Next, the media player general lingo version information is requested, and the media player sends the general lingo protocol version. This information is used to determine which features are available from the media player. The accessory is then switched into the extended interface mode, sending the EnterExtendedInterfaceMode Command, and the media player sends a first ACK indicating how long it will take the media player to switch modes. The media player sends a second ACK notifying the accessory of the mode switch, and the media player sends an extended interface protocol version for verification. If received, the accessory has successfully forced the media player into extended interface mode. The accessory should use the returned information to determine which features are available from the media player. This figure assumes the accessory is using the UART serial port link.

A connector interface system for a communication accessory is disclosed. The interface includes a docking connector. The docking connector includes first make/last break contacts that minimize internal damage to the internal electronics. The docking connector also includes a specific keying arrangement to prevent noncompliant connectors from being plugged in, and thereby minimizes potential damage to the multi-communication accessory. The remote connector provides for the ability to output audio, input audio, and output video. The connector system interface also includes a media player protocol to control accessory features. These controls allow for a user to control the functionality of media player in a variety of modes.

Figure 9:
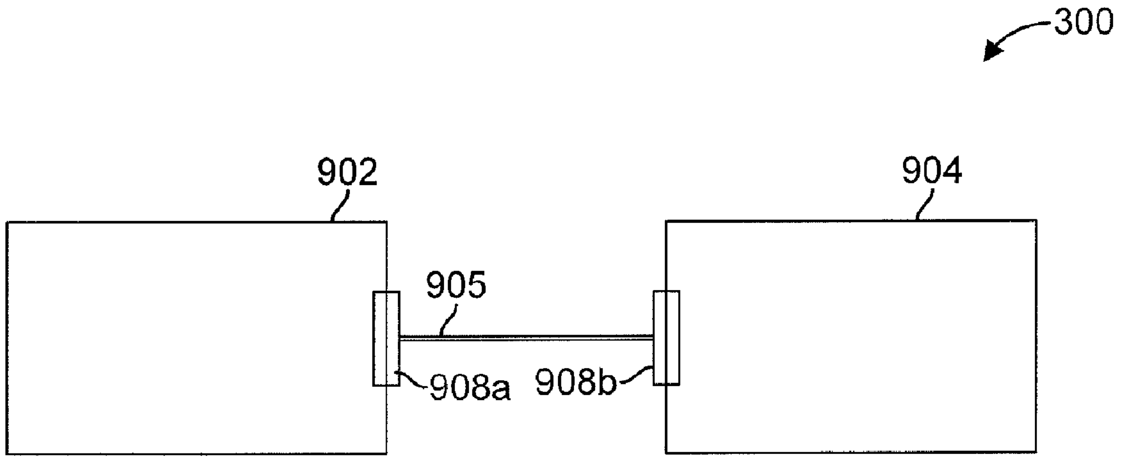
FIG. 9 illustrates an exemplary system using the connector interface system described herein.

It will be clear that the invention described herein provides significant functional enhancements when incorporated into prior art systems. FIG. 9 shows an exemplary system 900 using the connector described herein. The system includes at least two accessories 902 and 904 to be connected together. Each accessory 902 and 904 contains an enhanced connector system interface 902*a* and 902*b* as described herein. They can be connected together either wirelessly or via a cable. Alternatively, one of the accessories can be itself constructed integrally with the connector so that it can be docked in place when mated with the other accessory, for example, as is done with flash-backed memory sticks, or similar accessories that include an integral connector. When connected together, the accessories can exchange data via the connector interface system signals that would not be conveniently possible but for the existence of the connector pins and the protocol.

The connection interface system can be utilized with a plurality of accessory devices interfaces including, but not limited to, car stereo interface, home stereo interfaces, remote controls, radio interfaces, microphones, voice recorders, wireless accessories which allow for communications to other accessories and speakers.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claim.

What is claimed is:

1. A method of interaction between a media player and an accessory, the method comprising:

establishing, by the accessory, communication with the media player according to a media player accessory protocol, wherein the media player accessory protocol comprises at least a general lingo and a plurality of accessory lingoes;

receiving, by the accessory, version information from the media player, the version information indicating a version of the media player accessory protocol supported by the media player, selecting, by the accessory, an identification command based at least in part on the version information, the selected identification command indicating which one or more of the plurality of accessory lingoes is supported by the accessory; and transmitting, by the accessory, the selected identification command to the media player.

2. The method of claim 1 wherein the plurality of identification commands includes:

a single-lingo identification command that identifies exactly one of the plurality of accessory lingoes as being supported by the accessory; and a multi-lingo identification command that identifies one or more of the plurality of accessory lingoes as being supported by the accessory.

3. The method of claim 1 wherein the plurality of accessory lingoes includes one or more of a microphone lingo, a simple remote lingo, a display remote lingo, an extended interface lingo, or an RF transmitter lingo.

4. The method of claim 1 further comprising:

transmitting a request for the version information to the media player, wherein the version information is received in response to the request.

5. A method of interaction between a media player and an accessory, the method comprising:

establishing, by the accessory, communication with the media player according to a media player accessory protocol that comprises a general lingo and an extended interface lingo;

transmitting, by the accessory, information to the media player indicating that the accessory supports the extended interface lingo; and receiving, by the accessory, information from the media player indicating a version of the extended interface lingo supported by the media player.

6. The method of claim 5 wherein the media player is operable in either a standard user interface mode or an extended interface mode, the method further comprising:

receiving, by the accessory from the media player, a mode-indicating command of the general lingo, the mode-indicating command indicating whether the media player is currently operating in the standard user interface mode or the extended interface mode; and transmitting, by the accessory to the media player, a mode-control command of the general lingo, the mode-control command indicating that the media player should switch to the other mode.

7. A method of operating an accessory, the method comprising:

establishing, by the accessory, communication with a media player according to a media player accessory protocol that comprises a general lingo and an extended interface lingo; and transmitting, by the accessory to the media player, an identifying command of the general lingo indicating that the accessory supports only the extended interface lingo, wherein, in response to the identifying command, the media player is configured to enter an extended interface operating mode.

8. The method of claim 7 further comprising:

transmitting a version request command to the media player, the version command requesting information indicating a version of the extended interface lingo supported by the media player; and receiving a version information command from the media player in response to the version request command, the version information command including the information indicating the version of the extended lingo supported by the media player.

9. A method of operating an accessory, the method comprising:

establishing, by the accessory, communication with a media player according to a media player accessory protocol that comprises a general lingo and an extended interface lingo;

receiving, by the accessory, information from the media player indicating that the media player supports a particular version of the general lingo; and transmitting, by the accessory to the media player, either a first identifying command indicating that the accessory supports only the extended interface lingo or a second identifying command indicating that the accessory supports at least the extended interface lingo, wherein, in the event that the first identifying command is transmitted, the media player is configured to enter an extended interface operating mode in response to the first identifying command, and wherein, in the event that the second identifying command is transmitted, the media player is configured to not enter the extended interface operating mode in response to the second identifying command.

10. The method of claim 9 further comprising, in the event that the second identifying command is transmitted:

subsequently to transmitting the second identifying command, transmitting a mode-control command of the general lingo to the media player, wherein the media player is configured to enter the extended interface operating mode in response to the mode-control command.

11. An accessory comprising:

an interface system capable of communicating with a media player in accordance with a media player accessory protocol, the media player accessory protocol comprising at least a general lingo; and a controller configured to:

receive, from the media player, version information indicating a version of the media player accessory protocol supported by the media player; and determine, based on the version information, which commands of the general lingo are supported by the media player.

12. The accessory of claim 11 wherein the media player accessory protocol comprises a plurality of lingoes, and wherein the plurality of lingoes comprises the general lingo and a plurality of accessory lingoes supported by the media player.

13. The accessory of claim 12 wherein the version of the media player accessory protocol supported by the media player includes at least two different identifying commands within the general lingo, wherein one of the at least two different identifying commands is usable by the accessory to identify at most one of the accessory lingoes as being supported by the accessory and another of the at least two different identifying commands is usable by the accessory to identify one or more of the accessory lingoes as being supported by the accessory.

14. The accessory of claim 12 wherein the plurality of accessory lingoes includes a microphone lingo that comprises one or more of the following commands:

a first command receivable by the accessory and signaling a beginning of recording of audio input;

a second command receivable by the accessory and signaling an ending of recording of audio input;

a third command receivable by the accessory and signaling a beginning of playback of recorded audio input; or a fourth command receivable by the accessory and signaling an ending of playback of recorded audio input.

15. The accessory of claim 12 wherein the plurality of accessory lingoes includes a simple remote lingo that comprises a button status command sendable by the accessory, the button status command indicating a status of a user-operable control of the accessory.

16. The accessory of claim 12 wherein the plurality of accessory lingoes includes a display remote lingo that comprises any one or more of the following commands:

a first command sendable by the accessory, the first command specifying an equalizer setting to be applied by the media player;

a second command sendable by the accessory, the second command requesting information about one or more media assets queued for playback by the media player;

a third command receivable by the accessory, the third command providing information about one or more media assets queued for playback by the media player;

a fourth command sendable by the accessory, the fourth command requesting information about a state of the media player;

a fifth command receivable by the accessory, the fifth command providing information about the state of the media player; or a sixth command sendable by the accessory, the sixth command instructing the media player to change a state of the media player.

17. The accessory of claim 12 wherein the plurality of accessory lingoes includes an extended interface lingo that comprises any one or more of the following commands:

a first command sendable by the accessory, the first command requesting information about a currently playing media asset;

a second command receivable by the accessory, the second command providing information about the currently playing media asset;

a third command sendable by the accessory, the third command requesting information about a media asset queued for playback by the media player;

a fourth command receivable by the accessory, the fourth command providing information about the media asset queued for playback by the media player;

a fifth command sendable by the accessory, the fifth command requesting information from a database of media assets stored on the media player;

a sixth command receivable by the accessory, the sixth command providing information from the database of media assets stored on the media player; or a seventh command sendable by the accessory, the seventh command instructing the media player to select a media asset for playback.

18. The accessory of claim 12 wherein the plurality of accessory lingoes includes an RF transmitter lingo that comprises any one or more of the following commands:

a first command receivable by the accessory to indicate when the accessory should begin a transmission; or a second command receivable by the accessory to indicate when the accessory should end a transmission.

19. The accessory of claim 11 wherein the interface system includes a connector having a plurality of signal contacts arranged to contact corresponding signal contacts of a mating connector that is coupled to the media player.

20. The accessory of claim 11 wherein the interface system includes a wireless communication interface.

21. An accessory comprising:

an interface system capable of communicating with a media player according to a media player accessory protocol that comprises a general lingo and an extended interface lingo, the interface system being configured to:

receive version information from the media player, the version information identifying a version of the general lingo supported by the media player; and send to the media player either a single-lingo identifying command indicating that the accessory supports only the extended interface lingo or a multiple-lingo identifying command indicating that the accessory supports at least the extended interface lingo, wherein the media player is configured to determine, based at least in part on which of the first or second identifying commands was sent, whether to enter an extended interface mode.

22. The accessory of claim 21 wherein the interface system is further configured to:

send a mode-control command of the general lingo to the media player subsequently to a determination not to enter the extended interface mode, wherein, in response to the mode-control command, the media player is configured to enter the extended interface operating mode.

23. The accessory of claim 21 wherein the media player accessory protocol comprises a plurality of lingoes, and wherein the plurality of lingoes comprises the general lingo and a plurality of accessory lingoes supported by the media player, the plurality of accessory lingoes including the extended interface lingo.

24. The accessory of claim 23 wherein the plurality of accessory lingoes further includes one or more of a microphone lingo, a simple remote lingo, a display remote lingo, or an RF transmitter lingo.

25. The accessory of claim 21 wherein the interface system includes a connector having a plurality of pins arranged to contact corresponding pins of a mating connector coupled to the media player and wherein at least two of the plurality of pins are usable for serial data communication.

26. The accessory of claim 21 wherein the interface system includes a wireless communication interface.

27. A computer program product comprising a computer readable storage medium encoded with program code executable by an accessory, the program code comprising:

code that causes the accessory to establish communication with a media player according to a media player accessory protocol, wherein the media player accessory protocol comprises at least a general lingo and an extended interface lingo;

code that causes the accessory to receive version information from the media player, the version information indicating a version of the media player accessory protocol supported by the media player; and code that causes the accessory to send one of a plurality of identifying commands to the media player, the sent identifying command indicating that the accessory supports the extended interface lingo.

28. The computer program product of claim 27 wherein the media player is configured to determine, based at least in part on which one of the plurality of identifying commands was sent, whether to enter an extended interface mode, and wherein entering the extended interface mode includes disabling a control of the media player.

29. The computer program product of claim 27 wherein the media player is configured to determine, based at least in part on which one of the plurality of identifying commands was sent, whether to enter an extended interface mode, and wherein entering the extended interface mode includes displaying an extended-interface graphic on a display of the media player.

30. The computer program product of claim 29 wherein the program code further includes code that causes the accessory to transmit an image to the media player, wherein the image is displayed as the extended-interface graphic.

31. The computer program product of claim 27 wherein the media player accessory protocol further comprises one or more of a microphone lingo, a simple remote lingo, a display remote lingo, or an RF transmitter lingo.

32. A computer program product comprising a computer readable storage medium encoded with program code executable by an accessory, the program code comprising:

code that causes the accessory to establish communication with a media player according to a media player accessory protocol that comprises a general lingo and an extended interface lingo; and code that causes the accessory to send to the media player either a single-lingo identifying command indicating that the accessory supports only the extended interface lingo or a multi-lingo identifying command indicating that the accessory supports at least the extended interface lingo, wherein, in the event that the single-lingo identifying command is sent, the media player is configured to enter an extended interface operating mode.

33. The computer program product of claim 32 wherein, in the event that the multi-lingo identifying command is sent, the program code further comprises:

code that causes the accessory to send a mode command of the general lingo to the media player, wherein the media player is configured to enter the extended interface operating mode in response to the mode command.

34. The computer program product of claim 32 wherein the media player accessory protocol further comprises one or more of a microphone lingo, a simple remote lingo, a display remote lingo, or an RF transmitter lingo.

* * * * *